(12) United States Patent
Shishkin et al.

(10) Patent No.: US 10,754,863 B2
(45) Date of Patent: Aug. 25, 2020

(54) METHOD AND SYSTEM FOR RANKING A PLURALITY OF DOCUMENTS ON A SEARCH ENGINE RESULTS PAGE

(71) Applicant: YANDEX EUROPE AG, Lucerne (CH)

(72) Inventors: Alexandr Leonidovich Shishkin, Kirovo-Chepetsk (RU); Aleksandr Leonidovich Vorobev, Otradnoye (RU); Ekaterina Anatolievna Gladkikh, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 264 days.

(21) Appl. No.: 15/864,697

(22) Filed: Jan. 8, 2018

(65) Prior Publication Data

US 2018/0293242 A1    Oct. 11, 2018

(30) Foreign Application Priority Data

Apr. 5, 2017  (RU) ................................ 2017111480

(51) Int. Cl.
*G06F 16/2457* (2019.01)
*G06N 20/00* (2019.01)
(Continued)

(52) U.S. Cl.
CPC .... *G06F 16/24578* (2019.01); *G06F 16/3347* (2019.01); *G06F 16/9535* (2019.01);
(Continued)

(58) Field of Classification Search
CPC .. G06F 16/288; G06F 17/2785; G06F 16/285; G06F 16/9537; G06F 17/271; G06F 17/277; G06F 19/00; G06F 16/316
(Continued)

(56) References Cited

U.S. PATENT DOCUMENTS 7,792,353 B2  9/2010  Forman et al.
7,890,443 B2  2/2011  Zhang et al.
(Continued)

FOREIGN PATENT DOCUMENTS

RU    2608886 C2     1/2017
WO    2016/016733 A1  2/2016
WO    2017/001944 A1  1/2017

OTHER PUBLICATIONS

Search Report with regard to the counterpart RU Application No. 2017111480 completed Jun. 5, 2018.
(Continued)

*Primary Examiner* — Angelica Ruiz
(74) *Attorney, Agent, or Firm* — BCF LLP

(57) ABSTRACT

A system and method of ranking a plurality of documents on a search engine results page (SERP) in response to a query, the method comprising: computing a ranking score for each document, a given ranking score being indicative of an original rank of a respective document; computing a class association value for each document, a given class association value being a probability of a respective document to be associated with a predetermined class of documents having been determined by an operator, a given class association value being instrumental in increasing a magnitude of change of the original rank of the respective document; computing an amended ranking score for each document based on a respective ranking score and a respective class association value; and triggering a display of the SERP with the documents being ranked based on the respective amended ranking score.

18 Claims, 13 Drawing Sheets

(51) Int. Cl.
*G06F 16/9535* (2019.01)
*G06F 16/33* (2019.01)
*G06N 3/08* (2006.01)
*G06N 5/02* (2006.01)
*G06N 7/00* (2006.01)
*G06N 3/12* (2006.01)
*G06N 5/00* (2006.01)

(52) U.S. Cl.
CPC ............ *G06N 20/00* (2019.01); *G06N 3/08* (2013.01); *G06N 3/126* (2013.01); *G06N 5/003* (2013.01); *G06N 5/025* (2013.01); *G06N 7/005* (2013.01)

(58) Field of Classification Search
USPC ........... 707/600–831, 899, 999.001–999.206
See application file for complete search history.

(56) References Cited

U.S. PATENT DOCUMENTS

| | | |
|---|---|---|
| 8,051,072 B2 | 11/2011 | Zheng et al. |
| 8,165,974 B2 | 4/2012 | Privault et al. |
| 8,332,411 B2 | 12/2012 | Burges et al. |
| 8,713,023 B1 | 4/2014 | Cormack et al. |
| 8,935,258 B2 | 1/2015 | Svore et al. |
| 9,031,897 B2 | 5/2015 | Marcheret |
| 9,104,972 B1 | 8/2015 | Korolev et al. |
| 9,275,291 B2 | 3/2016 | Shulman et al. |
| 2003/0046098 A1 | 3/2003 | Kim |
| 2009/0319507 A1* | 12/2009 | Chen ................. G06F 16/24578 |
| 2011/0145175 A1* | 6/2011 | Agarwal ................ G06N 20/00 706/12 |
| 2012/0109860 A1 | 5/2012 | Xu et al. |
| 2014/0337257 A1 | 11/2014 | Chatterjee et al. |
| 2016/0098393 A1 | 4/2016 | Hebert |
| 2017/0075897 A1 | 3/2017 | Nikulin |
| 2018/0293242 A1* | 10/2018 | Shishkin ............. G06F 16/9535 |

OTHER PUBLICATIONS

Yongjing et al., "A Document Clustering and Ranking System for Exploring Medline Citations", Journal of the American Medical Informatics Association, 2007, vol. 14, No. 5, pp. 651-661.

Agichtein et al., "Improving Web Search Ranking by Incorporating User Behavior Information", SIGIR'06, 2006, Seattle, Washington, USA, 8 pages.

* cited by examiner

METHOD AND SYSTEM FOR RANKING A PLURALITY OF DOCUMENTS ON A SEARCH ENGINE RESULTS PAGE

CROSS-REFERENCE

The present application claims priority to Russian Patent Application No. 2017111480, filed on Apr. 5, 2017, entitled "Method and System for Ranking a Plurality of Documents on a Search Engine Results Page," the entirety of which is incorporated herein by reference.

FIELD OF TECHNOLOGY

The present technology relates to machine learning algorithms and, more specifically, to methods and systems for ranking a plurality of documents.

BACKGROUND

Improvements in computer hardware and technology coupled with the multiplication of connected mobile electronic devices have spiked interest in developing solutions for task automatization, outcome prediction, information classification and learning from experience, resulting in the field of machine learning. Machine learning, closely related to data mining, computational statistics and optimization, explores the study and construction of algorithms that can learn from and make predictions on data.

The field of machine learning has evolved extensively in the last decade, giving rise to self-driving cars, speech recognition, image recognition, personalization, and understanding of the human genome. In addition, machine learning enhances different information retrieval activities, such as document searching, collaborative filtering, sentiment analysis, and so forth.

Machine learning algorithms (MLAs) may generally be divided into broad categories such as supervised learning, unsupervised learning and reinforcement learning. Supervised learning consists of presenting a machine learning algorithm with training data consisting of inputs and outputs labelled by assessors, where the goal is to train the machine learning algorithm such that it learns a general rule for mapping inputs to outputs. Unsupervised learning consists of presenting the machine learning algorithm with unlabeled data, where the goal is for the machine learning algorithm to find a structure or hidden patterns in the data. Reinforcement learning consists of having an algorithm evolving in a dynamic environment without providing the algorithm with labeled data or corrections.

Search engines are now widely used for performing information searching and retrieval, which allow documents to be identified, ranked in response to user queries, and then supplied to the users. Learning to rank (LTR) is the application of machine learning in the construction of ranking models for information retrieval and is a common search engine tool for ranking documents in response to user queries. Generally, a system may maintain a pool of documents, where a ranking model may rank documents responsive to a query, and then returns the most relevant documents. The ranking model may have been previously trained on training documents. As stated previously, the sheer volume of documents available on the Internet combined with its continuous growth makes labeling not only difficult, but requires a lot of computational and monetary resources, as it is often performed by human assessors. Furthermore, the labels assigned by human assessors to a given document may be prone to errors.

U.S. Pat. No. 8,935,258 issued on Jan. 13, 2015, to Svore et al. teaches identifying sample data items having the greatest likelihood of being mislabeled when previously judged, and selecting those data items for re-judging. In one aspect, lambda gradient scores are summed for pairs of sample data items to compute re-judgment scores for each of those sample data items. The re-judgment scores indicate a relative likelihood of mislabeling. Once the selected sample data items are re-judged, a new training set is available, whereby a new ranker may be trained.

Additionally, in some instances, ranking models employed by search engines evaluate document relevance based on previous user interactions or feedback associated with documents. Therefore, sparseness of data associated with previous user interactions or feedback limits the pool size and variety of training data used during training of certain rank models and, in turn, may limit the capabilities of search engines to effectively rank some documents according to their relevance to the user query.

U.S. Patent Publication No. 2012/0109860 A1 by Xu et al. teaches that training data is used by learning-to-rank algorithms for formulating ranking algorithms. The training data can be initially provided by human judges, and then modeled in light of user click-through data to detect probable ranking errors. The probable ranking errors are provided to the original human judges, who can refine the training data in light of this information.

For the foregoing reasons, there is a need for methods and systems for identifying potentially erroneously ranked documents by a machine learning algorithm.

SUMMARY

Embodiments of the present technology have been developed based on developers' appreciation that while different methods have been developed in machine learning to rank information, it is often difficult to detect errors in ranking. Embodiments of the present technology have been developed based on developers' appreciation of at least one technical problem associated with the prior art solutions. Therefore, developers have devised method and systems for selecting potentially erroneously ranked documents by a machine learning algorithm.

In accordance with a first broad aspect of the present technology, there is provided a method of ranking a plurality of documents on a search engine results page (SERP) in response to a query associated with a user of a search engine. The method is executed on a server implementing the search engine. The method comprises computing, by a ranking machine learning algorithm (MLA) implemented by the server, a ranking score for each document of the plurality of documents. A given ranking score is indicative of an estimated relevance of a respective document to the query and of an original rank of a respective document on the SERP. The method also comprises computing, by the server, a class association value for each document of the plurality of documents. A given class association value is a probability of a respective document to be associated with a predetermined class of documents that has been determined by an operator. A given class association value is instrumental in increasing a magnitude of change of the original rank of the respective document. The method also comprises computing, by the server, an amended ranking score for each document of the plurality of documents based on a respective ranking score and a respective class association value. A given amended ranking score is indicative of an amended relevance of a respective document to the query. The method also comprises triggering, by the server, a display of the SERP with the documents of the plurality of documents that are ranked based on the respective amended ranking score.

In some implementations, the plurality of documents comprises at least one document associated with limited previous user feedback and the amended ranking score of the at least one document is one of superior and inferior to the respective ranking score.

In some implementations, the method further comprises gathering, by the server, user feedback associated with the at least one document upon the user interacting with the at least one document ranked based on the respective amended ranking score on the SERP.

In some implementations, the method further comprises storing, by the server, the user feedback associated with the at least one document in a storage.

In some implementations, the ranking MLA has been trained based on, at least, a set of training documents, respectively associated previous user feedback for each training document of the set of training documents and a respectively associated human assessor score for each training document of the set of training documents. As such, the method further comprises retraining, by the server, the ranking MLA based on an enhanced set of training documents and a respectively associated previous user feedback for each training document of the enhanced set of training documents. The enhanced set of training documents comprises the training documents of the set of training documents and the at least one document.

In some implementations, the amended ranking score is instrumental in causing a change of the original rank of the at least one document.

In some implementations, the change of the original rank of the at least one document is instrumental in increasing a likelihood of user interaction with the at least one document in comparison with the original rank.

In some implementations, the step of computing the class association value for each document is executed by a prediction MLA implemented by the server. The prediction MLA is distinct from the ranking MLA. The prediction MLA has been trained based on a second set of training documents and a respectively associated human assessed class of each training document of the second set of training documents. Each respective associated human assessed class is one of a plurality of human assessed classes.

In some implementations, for a given document of the plurality of documents the prediction MLA outputs the probability of the given document to be associated with the predetermined class of documents. The predetermined class is one of the plurality of human assessed classes.

In some implementations, the set of training documents and the second set of training documents comprise at least one identical training document.

In some implementations, a given document that has a high probability of being associated with the predetermined class is more likely to be associated with a high magnitude of change of the original rank of the given document than another document that has a low probability of being associated with the predetermined class.

In some implementations, the method further comprises computing, by the server, a modulating parameter for each document of the plurality of documents, a given modulating parameter being instrumental in controlling the magnitude of change of the original rank of the respective document. As such, the step of computing, by the server, the amended ranking score for each document of the plurality of documents is based on the respective ranking score, the respective class association value and the respective modulating parameter.

In some implementations, the step of computing, by the server, the amended ranking score for each document of the plurality of documents comprises application of a formula:

$$ARS_d = RS_d + W_d * CAV_d$$

In accordance with a second broad aspect of the present technology, there is provided a server for ranking a plurality of documents on a search engine results page (SERP) in response to a query associated with a user of a search engine. The server implements the search engine and is configured to compute, by a ranking machine learning algorithm (MLA) implemented by the server, a ranking score for each document of the plurality of documents. A given ranking score is indicative of an estimated relevance of a respective document to the query and of an original rank of a respective document on the SERP. The server is also configured to compute a class association value for each document of the plurality of documents. A given class association value is a probability of a respective document to be associated with a predetermined class of documents having been determined by an operator. Also, a given class association value is instrumental in increasing a magnitude of change of the original rank of the respective document. The server is also configured to compute an amended ranking score for each document of the plurality of documents based on a respective ranking score and a respective class association value. A given amended ranking score is indicative of an amended relevance of a respective document to the query. The server is also configured to trigger a display of the SERP with the documents of the plurality of documents that are ranked based on the respective amended ranking score.

In some implementations, the plurality of documents comprises at least one document associated with limited previous user feedback and the amended ranking score of the at least one document is one of superior and inferior to the respective ranking score.

In some implementations, the server is further configured to gather user feedback associated with the at least one document upon the user interacting with the at least one document ranked based on the respective amended ranking score on the SERP.

In some implementations, the server is further configured to store the user feedback associated with the at least one document in a storage.

In some implementations, the ranking MLA has been trained based on, at least, a set of training documents, respectively associated previous user feedback for each training document of the set of training documents and a respectively associated human assessor score for each training document of the set of training documents. The server is further configured to retrain the ranking MLA based on an enhanced set of training documents and a respectively associated previous user feedback for each training document of the enhanced set of training documents. The enhanced set of training documents comprises the training documents of the set of training documents and the at least one document.

In some implementations, the amended ranking score is instrumental in causing a change of the original rank of the at least one document.

In some implementations, the change of the original rank of the at least one document is instrumental in increasing a likelihood of user interaction with the at least one document in comparison with the original rank.

In some implementations, the server is configured to compute the class association value for each document by a prediction MLA implemented by the server. The prediction MLA is distinct from the ranking MLA. The prediction MLA having been trained based on a second set of training documents and a respectively associated human assessed class of each training document of the second set of training documents, each respective associated human assessed class which is one of a plurality of human assessed classes.

In some implementations, for a given document of the plurality of documents the prediction MLA outputs the probability of the given document to be associated with the predetermined class of documents. The predetermined class is one of the plurality of human assessed classes.

In some implementations, the set of training documents and the second set of training documents comprise at least one identical training document.

In some implementations, a given document that has a high probability of being associated with the predetermined class is more likely to be associated with a high magnitude of change of the original rank of the given document than another document that has a low probability of being associated with the predetermined class.

In some implementations, the server is further configured to compute a modulating parameter for each document of the plurality of documents. A given modulating parameter is instrumental in controlling the magnitude of change of the original rank of the respective document. Also, the server is configured to compute the amended ranking score for each document of the plurality of documents based on the respective ranking score, the respective class association value and the respective modulating parameter.

In some implementations, the server being configured to compute the amended ranking score for each document of the plurality of documents comprises application of a formula:

$$ARS_d = RS_d + W_d * CAV_d$$

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smartphones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smartphones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
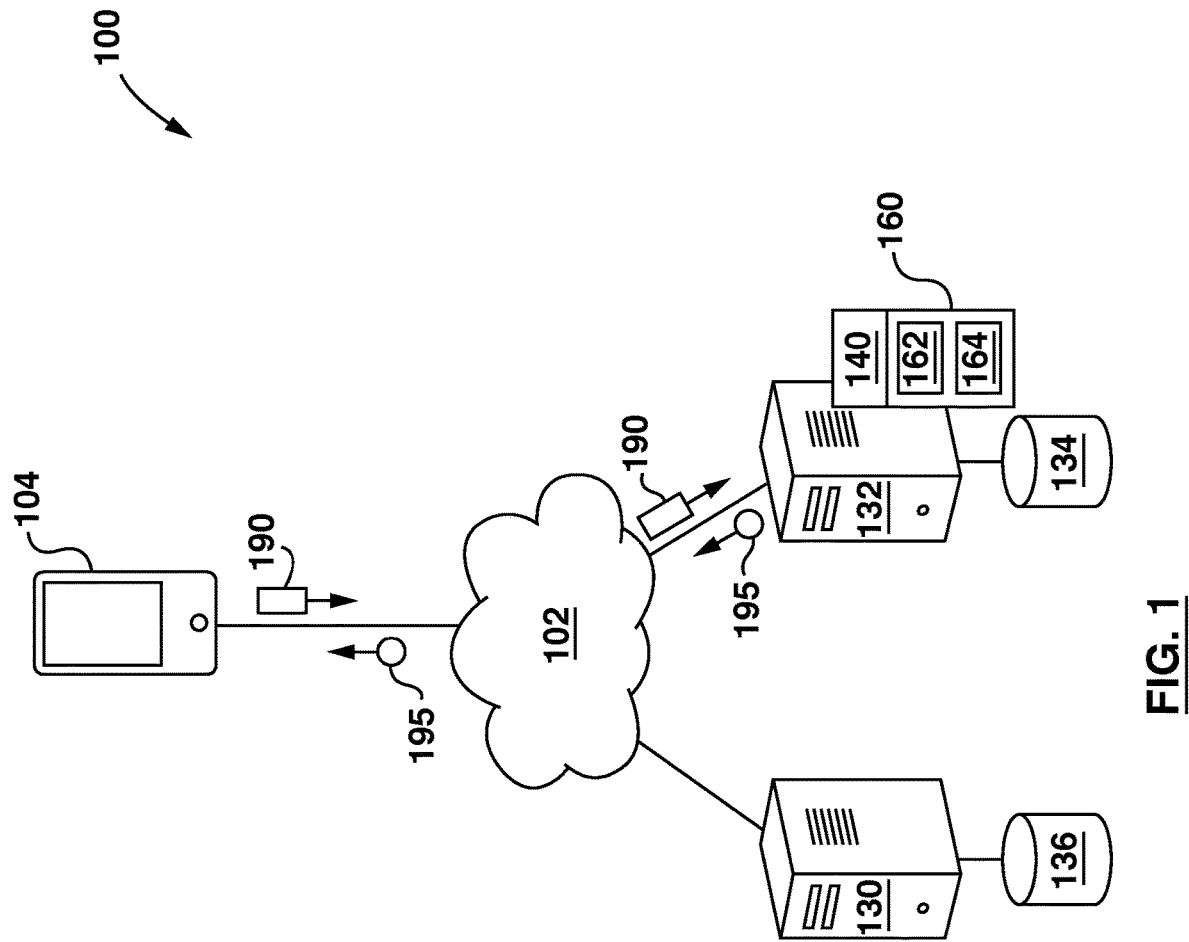
FIG. 1 is an illustration of a system for ranking a plurality of documents according to some aspects of the present technology.

With reference to FIG. 1, there is depicted a system 100, the system implemented according to embodiments of the present technology. It is to be expressly understood that the system 100 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The system 100 comprises a communication network 102 for providing communication between various components of the system 100 communicatively coupled thereto. In some non-limiting embodiments of the present technology, the communication network 102 can be implemented as the Internet. In other embodiments of the present technology, the communication network 102 can be implemented differently, such as any wide-area communication network, local-area communication network, a private communication network and the like. The communication network 102 can support exchange of messages and data in an open format or in an encrypted form, using various known encryption standards.

The system 100 comprises a user device 104 communicatively coupled to the communication network 102. It should be noted that the scope of the present technology is not limited to a system 100 comprising a single user device, such as the user device 104, and generally speaking, it can be said that a plurality of user devices having any number of user devices may be communicatively coupled to the communication network 102.

The user device 104 is associated with a user (not depicted). It should be noted that the fact that the user device 104 is associated with the user does not need to suggest or imply any mode of operation—such as a need to log in, a need to be registered or the like. The implementation of the user device 104 is not particularly limited, but as an example, the user device 104 may be implemented as a personal computer (desktops, laptops, netbooks, etc.), a wireless communication device (a cell phone, a smartphone, a tablet and the like), as well as network equipment (a router, a switch, or a gateway). In FIG. 1 however, the user device 104 is implemented as the smartphone.

Also coupled to the communication network 102 are a training server 130 and a ranking server 132. Even though in the depicted embodiment the training server 130 and the ranking server 132 are depicted as separate entities, functionalities thereof can be executed by a single server.

In an example of an embodiment of the present technology, the training server 130 can be implemented as a Dell™ PowerEdge™ Server running the Microsoft™ Windows Server™ operating system. Needless to say, the training server 130 can be implemented in any other suitable hardware and/or software and/or firmware or a combination thereof. In the depicted non-limiting embodiment of present technology, the training server 130 is a single server. In alternative non-limiting embodiments of the present technology, the functionality of the training server 130 may be distributed and may be implemented via multiple servers.

In an example of an embodiment of the present technology, the ranking server 132 can be implemented as a Dell™ PowerEdge™ Server running the Microsoft™ Windows Server™ operating system. Needless to say, the ranking server 132 can be implemented in any other suitable hardware and/or software and/or firmware or a combination thereof. In the depicted non-limiting embodiment of present technology, the ranking server 132 is a single server. In alternative non-limiting embodiments of the present technology, the functionality of the ranking server 132 may be distributed and may be implemented via multiple servers.

Even though the training server 130 and the ranking server 132 have been described using an example of the same hardware, they do not need to be implemented in the same manner therebetween.

In some embodiments of the present technology, the ranking server 132 is under control and/or management of a search engine, such as that provided by YANDEX™ search engine of Yandex LLC of Lev Tolstoy Street, No. 16, Moscow, 119021, Russia. However, the ranking server 132 can be implemented differently (such as a local searcher and the like). The ranking server 132 is configured to maintain a search database 134, which contains an indication of various resources available and accessible via the communication network 102.

The process of populating and maintaining the search database 134 is generally known as "crawling" where a crawler application 140 executed by the ranking server 132 is configured to "visit" various web sites and web pages accessible via the communication network 102 and to index the content thereof (such as associate a given web resource to one or more key words). In some embodiments of the present technology, the crawler application 140 maintains the search database 134 as an "inverted index". Hence, the crawler application 140 of the ranking server 132 is configured to store information about such indexed web resources in the search database 134.

The ranking server 132 is configured to receive search specifications from the user or any other means in order to begin a retrieving operation of resources associated with the search specifications. The search specifications may be a query that is one or more keywords that are used in a resource research.

For example, when the ranking server 132 receives a search query from a given user (such as for examples, "Best travelling destinations in South America"), the ranking server 132 is configured to execute a ranking application 160. Generally speaking, a given ranking application is configured to retrieve and rank search results that may be generated using any search engine or resource retrieval algorithm.

The ranking application 160 is configured to access the search database 134 to retrieve an indication of a plurality of resources that are potentially relevant to the user-submitted search query. In this example, the ranking application 160 is further configured to rank the so-retrieved potentially relevant resources so that they can be presented in a ranked order on a Search Engine Results Page (SERP) to the given user, such that the SERP presents so-ranked more relevant resources at a top of the list. In response to being presented with the SERP, the given user may "interact" with some of the resources on the SERP. This provides user feedback for the one or more resources with which the given user has interacted. These user interactions may be recorded, collected and stored in associated with the respective resources in the search database 134.

In order to rank the so-retrieved potentially relevant resources on the SERP, the ranking application 160 may be configured to execute a ranking algorithm. In some embodiments of the present technology, the ranking algorithm is a Machine Learning Algorithm (MLA). In various embodiments of the present technology, the ranking application 160 may execute the MLA that is based on neural networks, decision tree models, association rule learning based MLA, Deep Learning based MLA, inductive logic programming based MLA, support vector machines based MLA, clustering based MLA, Bayesian networks, reinforcement learning based MLA, representation learning based MLA, similarity and metric learning based MLA, sparse dictionary learning based MLA, genetic algorithms based MLA, and the like. The ranking application 160 may employ a supervised-learning based MLA and/or a semi-supervised-learning based MLA without departing from the scope of the present technology.

In some embodiments and as depicted in FIG. 1, the ranking application 160 may employ at least a ranking MLA 162 in order to rank potentially relevant resources on the SERP.

In other embodiments of the present technology, and as it will be described below, the ranking application 160 may employ more than one ranking algorithm in order to rank potentially relevant resources on the SERP. For example, the ranking application 160 may employ the ranking MLA 162 and a prediction MLA 164 in order to rank potentially relevant resources on the SERP. Respective functionalities of the ranking MLA 162 and the prediction MLA 164 will be further described in greater detail herein below.

It should be noted that although for the sake of simplicity the following description is given in a context of retrieving and ranking documents via the search engine, the techniques and methods described herein can be applied to online resources in general and to other types of retrieval and ranking activities, such as information filtering, sentiment analysis, online content selection, selection of targeted content, recommendation systems, and the like without departing from the scope of the present technology.

Generally speaking, the ranking application 160 can be said to be used in two phases. A first phase of the two phases is a training phase. During the training phase, the ranking application 160 is "trained" to derive a ranking MLA formula for the ranking MLA 162. Also during the training phase, as will be described further below, the ranking application 160 is "trained" to derive a prediction MLA formula for the prediction MLA 164.

A second phase of the two phases is an in-use phase where the ranking application 160 is used to rank documents.

In additional embodiments of the present technology, the ranking application 160 may be "retrained", following the in-use phase, to derive a new ranking MLA formula or to calibrate the ranking MLA formula for the ranking MLA 162. Indeed, as it will be described further below, the ranking MLA 162 can be "retrained" based on enhanced training data resulting from the implementation of some embodiments of the present technology.

Figure 2:
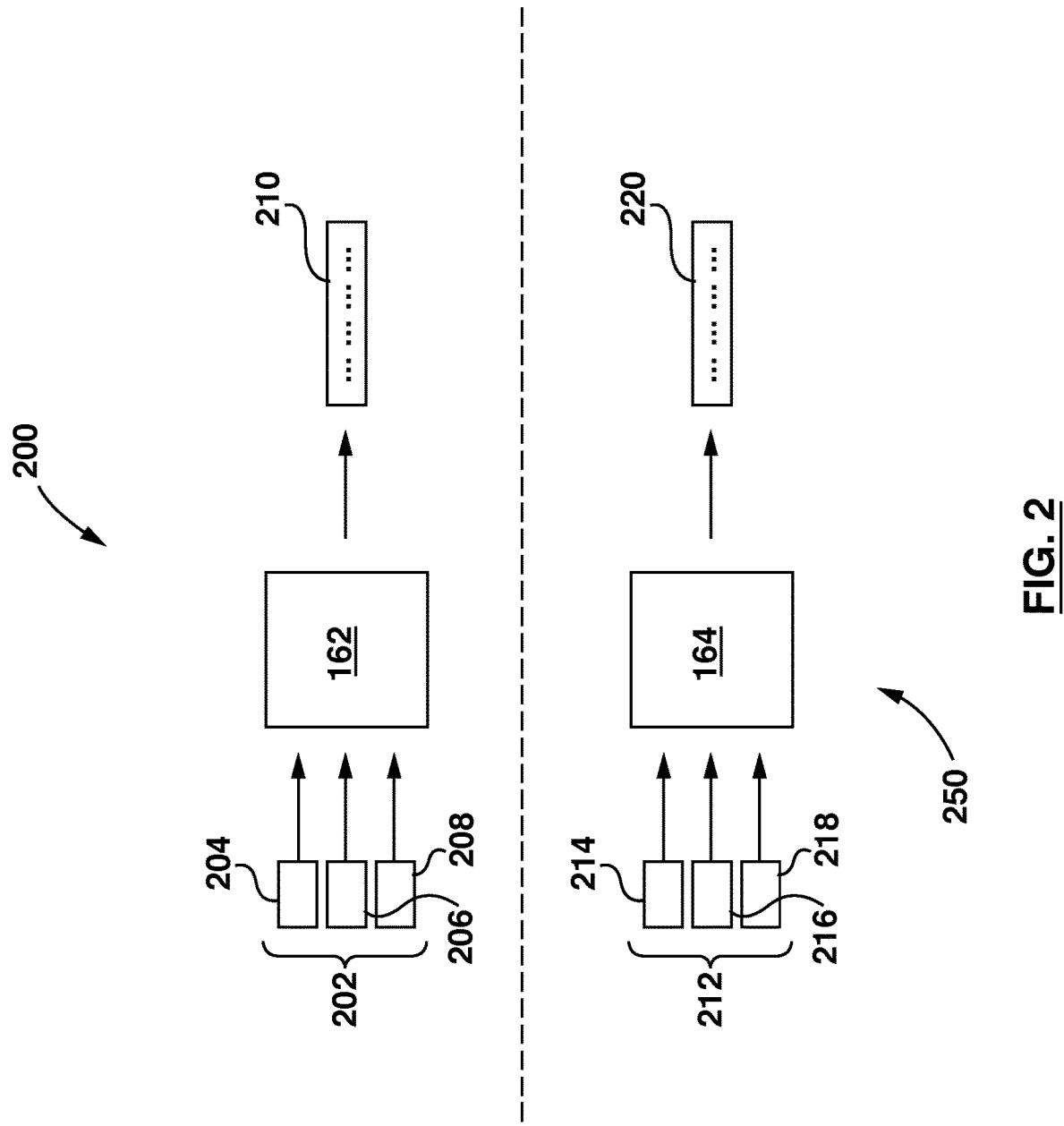
FIG. 2 schematically illustrates a training phase of a ranking application implemented by the system of FIG. 1.

In FIG. 2, the training phase of the ranking application 160 is schematically illustrated via a training process 200 of the "untrained" ranking MLA 162 and via a training process 250 of the "untrained" prediction MLA 164. The training processes 200 and 250 may be performed by the training server 130, for example. To that end, the "untrained" ranking MLA 162 and the "untrained" prediction MLA 164 may be provided to the training server 130 by the ranking server 132. As an example, the ranking server 132 may provide information associated with the "untrained" ranking MLA 162 and the "untrained" prediction MLA 164 to the training server 130 in a MLA data packet (not depicted) which may be sent via the communication network 102.

The training process 200 of the "untrained" ranking MLA 162 will now be described.

As part of the training process 200, the "untrained" ranking MLA 162 is supplied with a set of training objects 202, the set of training objects 202 including a plurality of training objects—such as a first training object 204, a second training object 206, a third training object 208, as well as other training objects potentially present in the set of training objects 202. It should be understood that the set of training objects 202 is not limited to the first training object 204, the second training object 206, and the third training object 208 depicted in FIG. 2. And, as such, the set of training objects 202 may include a number of additional training objects (such as hundreds, thousands or hundreds of thousands of additional training objects similar to the depicted ones of the first training object 204, the second training object 206, and the third training object 208).

Figure 3:
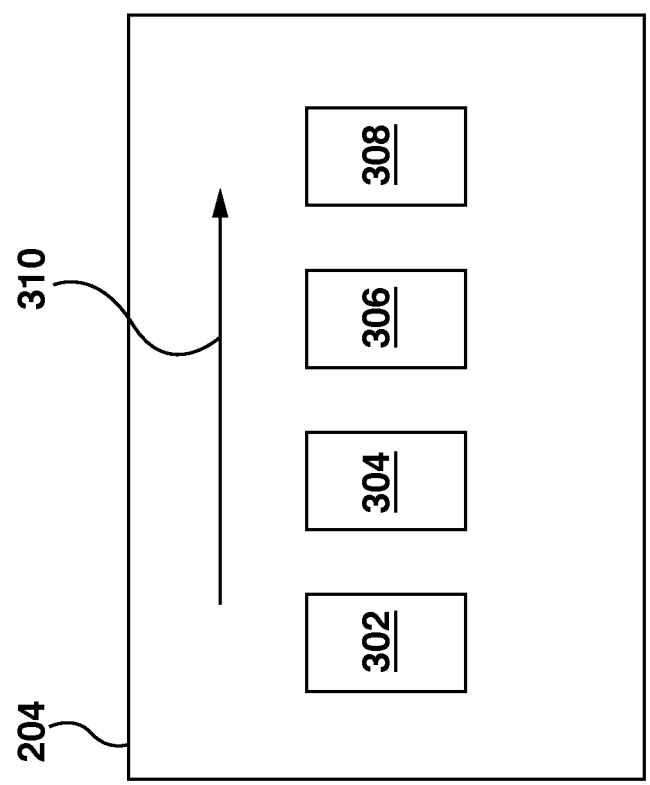
FIG. 3 depicts a training object used during a training procedure of a ranking MLA of the ranking application.

With reference to FIG. 3, which schematically depicts a given training object of the set of training objects 202 (in this case, the first training object 204), using the example of the first training object 204, each training object 204, 206, 208 in the set of training objects 202 comprises a query-document pair (which includes an indication of a training query 302 and an associated training document 304, which potentially is responsive to the training query 302), assessed class 306 and a previous user feedback data point 308 representative of previous user feedback associated with the training document 304.

It should be noted however that at least in some embodiments of the present technology, the "untrained" ranking MLA 162 may have been initially subjected to a preliminary training phase. During the preliminary training phase, a given preliminary ranking formula may be derived in order to implement the "untrained" ranking MLA 162. The given preliminary ranking formula may be derived based on query-document pairs and respectively associated assessed classes that are used as preliminary training data. Put another way, in order to implement the "untrained" ranking MLA 162 by the ranking server 132 and to further train it via the training process 200, the given preliminary ranking formula may have been derived based on preliminary training data comprising query-document pairs and respectively associated assessed classes.

Generally speaking, the assessed class 306 is indicative of how responsive or useful the training document 304 is to the training query 302 (a quality or usefulness of training document 304 for a given user conducting a search query identical or similar to the training query 302). The assessed class 306 has been assigned to the training document 304 by a human assessor. In some embodiments, the human assessor may select a given class from a plurality of human assessed classes of documents and assign it as the assessed class 306 to the training document 304. Depending on specific implementations, a given human assessor is provided with one of various class-labelling instructions (i.e., one of various pluralities of human assessed classes), such as but not limited to:

a scale of "1" to "5",
a scale of "1" to "2",
a scale of "1" to "10",
a scale of "good" and "bad",
a scale of "low usefulness", "medium usefulness" and "high usefulness",
a scale of "Perfect-Excellent-Good-Fair-Bad",
etc.

In some embodiments of the present technology, the training server 130 can store an indication of the given training object 204, 206, 208 and the associated assessed class 306 in a training database 136, coupled to or otherwise accessible by the training server 130. For explanation purposes only, let's assume that the assessed class 306 is indicative of whether the training document 304 has a "Bad", "Fair", "Good", "Excellent" or "Perfect" responsiveness or usefulness in view of the training query 302. However, it should be noted that other pluralities of human assessed classes of documents can be provided to the human assessors as part of class-labeling instructions in order to assign one of the plurality of human assessed classes to each query-document pair.

Generally speaking, the previous user feedback data point 308 is indicative of previous user interactions with the training document 304 after search queries identical or similar to the training query 302 have been conducted. For example, the previous user feedback data point 308 may comprise previous click-through data associated with the training document 304 and where the previous click-through data was gathered from users that "interacted" with the training document 304 following a submission of search queries similar or identical to the training query 302. As such, the previous user feedback may comprise information related to:

a number of times the training document 304 has been clicked or selected,
an amount of time that users spent viewing the training document 304,
a number of clicks executed by users while viewing the training document 304, and
a number of links clicked or selected by users on the training document 304.

It should be noted that the click-through data may comprise information related to additional metrics, such as numbers or frequencies of different user interactions to those presented above. It should also be noted that the previous user feedback data point 308 may be indicative of other previous user interactions that are different from previous click-through data without departing from the scope of the present technology.

In some embodiments, the set of training objects 202 may be retrieved from or supplied by the training database 136 depicted in FIG. 1. The training database 136 may store information related to the set of training objects 202. For example, the training database 136 may store a large number of query-document pairs. The training database 136 may also store information related to a respective assessed class associated with each query-document pair stored therein.

Moreover, the training database 136 may store previous user feedback data points associated with each respective query-document pair. However, it should be noted that the training database 136 can store additional information for training purposes of the ranking application 160.

Therefore, upon commencing the training process 200, the training server 130 may be configured to request the set of training objects 202 from the training database 136. In response, the training database 136 may be configured to generate a training data packet (not depicted) comprising information associated with the set of training objects 202. In some embodiments, each one of the set of training objects 202 may be randomly selected from a pool of training documents (not depicted). In other embodiments, each one of the set of training objects 202 may be algorithmically selected from the pool of training documents in order to provide a larger diversity of training objects for the training process 200. In yet another embodiment, each one of the set of training objects 202 may be selected from the pool of training documents based on specific criteria determined by an operator of the ranking application 160 or based on a specific ranking task or application of the ranking MLA 162.

In some embodiments, the training object 204, 206, 208 can be also said to be associated with a respective feature vector 310. The feature vector 310 can be generated by the training server 130 during the training phase of the ranking application 160. The feature vector 310 is representative of one or more characteristics of the associated training objects 204, 206, 208. The use of the object feature vector 308 will be described in greater detail herein below.

Returning to the description of FIG. 2, as part of the training process 200, the "untrained" ranking MLA 162 may analyze the set of training objects 202 to derive a ranking MLA formula 210, which in a sense is based on hidden relationships between various components of each training object, such as between respective training queries, respective training documents, respective assessed classes and respective previous user feedback data points.

In some embodiments of the present technology, the "untrained" ranking MLA 162 is trained via the training process 200 in order to compute a given ranking score for a given document based on a given query-document pair and a respective previous user feedback data point associated with the document of the given query-document pair. In other words, when the ranking MLA 162 has been trained by the training process 200, the ranking MLA 162 may be inputted with the given query-document pair and the respective previous user feedback data point. In response, the ranking MLA 162 is configured to output (i.e., compute) the given ranking score for the given document of the given query-document pair.

Generally speaking, a given ranking score is indicative of an estimated relevance of a given document to a given query. In other words, when the given ranking score is provided for a given query-document pair, the given ranking score is indicative of an estimated relevance of the document from the given query-document pair to the query from the given query-document pair.

In some embodiments, the ranking MLA 162 is configured to compute the given ranking score based on a respective object feature vector associated with the given query-document pair. A given feature vector may comprise information associated with a respective query, a respective document, respective previous user feedback data point and additional document characteristics.

In some embodiments of the present technology, after the completion of the training process 200 of the "untrained" ranking MLA 162, the ranking MLA formula 210 may be sent or otherwise provided by the training server 130 to the ranking server 132 via the communication network 102. For instance, the training server 130 may "push" information associated with the ranking MLA formula 210 to the ranking server 132 without a request therefor by the ranking server 132. In another instance, the ranking server 132 may "pull" or otherwise request the information associated with the ranking MLA formula 210 from the training server 130. To that end, the training server 130 may be configured to generate a post-training data packet (not depicted) comprising information associated with the ranking MLA formula 210 and to send it to the ranking server 132. Upon receiving the post-training data packet, the ranking MLA 162 may be configured to implement the ranking MLA formula 210.

Figure 5:
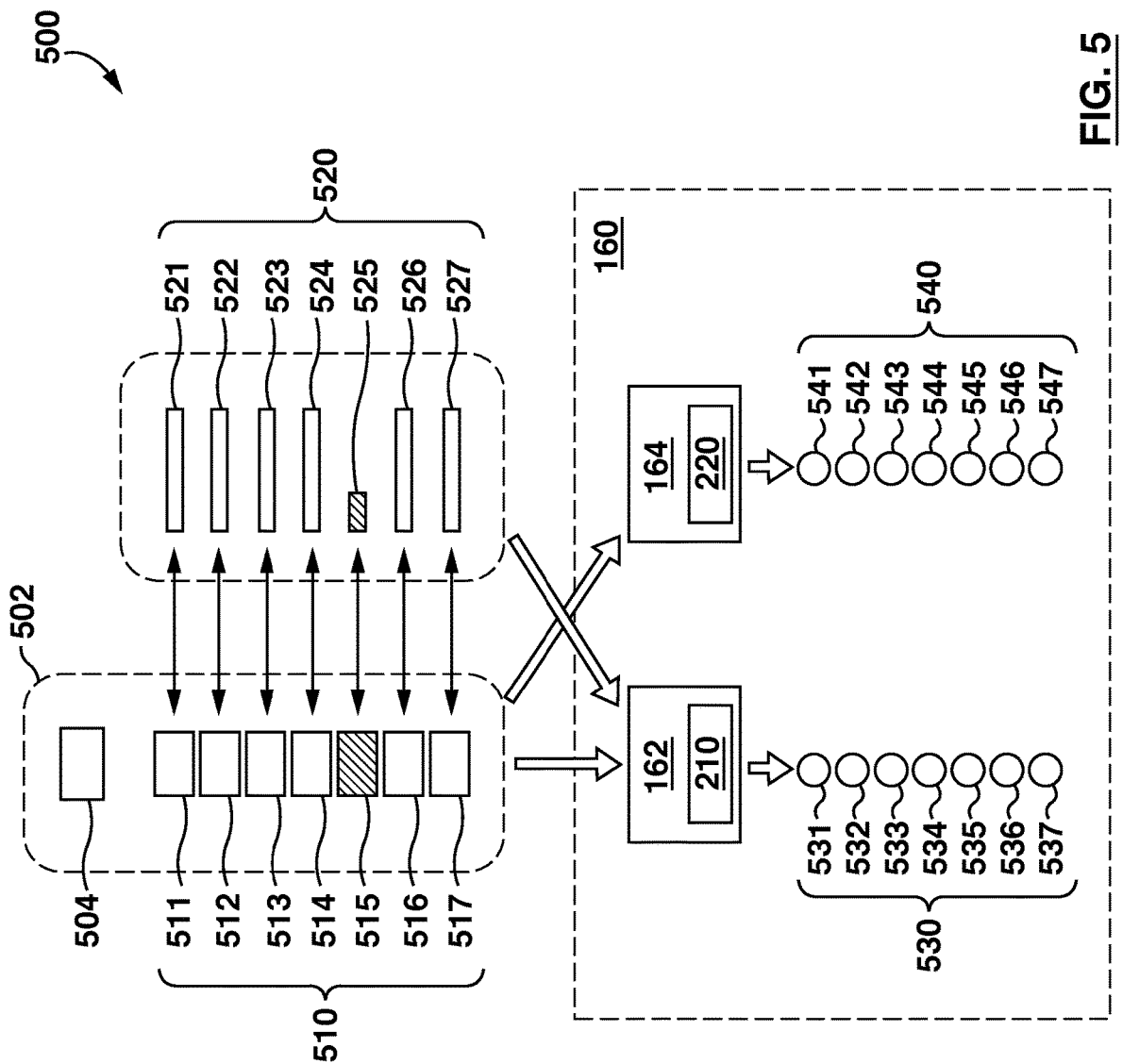
FIG. 5 schematically illustrates an in-use phase of the ranking application implemented by the system of FIG. 1.

With reference to FIGS. 1 and 5, after the completion of the training process 200, the user of the user device 104 may submit a query 504 to the search engine of the ranking server 132. To that end, the user may open a browser application (not depicted) executed by the user device 104 and enter the query 504 via a user interface device implemented by the user device 104, such as a keyboard for example. Alternatively, the user may dictate one or more words and the user device 104 may be configured to execute a speech recognition algorithm in order to determine the query 504 based on the one or more words. Then, the user device 104 may be configured to generate a query data packet 190 which contains information associated with the query 504 for which the user is desirous of receiving search results from the ranking server 132. The user device 104 may send the query data packet 190 to the ranking server 132 via the communication network 102.

In some embodiments of the present technology, the ranking server 132 may be configured to access the search database 134 in order to retrieve a plurality of documents 510 that are potentially relevant to the query 504. The ranking server 132 may then proceed with ranking all documents of the plurality of documents 510. To that end, the ranking server 132 may be configured to access the search database 134 in order to retrieve a respective previous user feedback data point associated with each document of the plurality of documents 510. As depicted in FIG. 5, the ranking server 132 may be configured to retrieve a set of previous user feedback data points 520, if available, for example.

For explanation purposes only, the plurality of documents 510 comprises documents 511, 512, 513, 514, 515, 516 and 517 and the set of previous user feedback data points 520 comprises respectively associated previous user feedback data points 521, 522, 523, 524, 525, 526 and 527. However, as contemplated in some implementations of the present technology, at least one document of the plurality of documents 510 may be associated with limited previous user feedback. In other words, the at least one document was not "interacted with" or "explored" enough previously by users of the search engine. In this example, the at least one document is the document 515 and the limited previous user feedback is represented by the previous user feedback data point 525 associated with the document 515.

In order to rank the documents of the plurality of documents 510, the ranking server 132 may input into the ranking MLA 162 query-document information 502, which comprises the query 504 and the plurality of documents 510, and the set of previous user feedback data points 520. In the query-document information 502, each query-document pair comprises the query 504 and a respective document of the plurality of documents 510. Put another way, in this example, the ranking server 132 may be configured to input seven query-document pairs with a respectively associated previous user feedback data point, if available. Each query-document pair with a respective previous user feedback inputted in the ranking MLA 162 during the in-use phase will be referred herein as a "ranking input set".

In some embodiments of the present technology, the ranking MLA 162 may be configured to output (i.e., compute) a given ranking score for each ranking input set that was inputted therein by the ranking server 132. For explanation purposes only, the ranking MLA 162 may be configured to compute:

A first ranking score 531 for a first ranking input set that comprises the query 504, the document 511 and the previous user feedback data point 521;

A second ranking score 532 for a second ranking input set that comprises the query 504, the document 512 and the previous user feedback data point 522;

A third ranking score 533 for a third ranking input set that comprises the query 504, the document 513 and the previous user feedback data point 523;

A fourth ranking score 534 for a fourth ranking input set that comprises the query 504, the document 514 and the previous user feedback data point 524;

A fifth ranking score 535 for a fifth ranking input set that comprises the query 504, the document 515 (i.e., the at least one document associated with limited previous user feedback) and the previous user feedback data point 525 (i.e. the limited previous user feedback);

A sixth ranking score 536 for a sixth ranking input set that comprises the query 504, the document 516 and the previous user feedback data point 526; and A seventh ranking score 537 for a seventh ranking input set that comprises the query 504, the document 517 and the previous user feedback data point 527.

Each given ranking score of the plurality of ranking scores 530 is indicative of an estimated relevance of a respective document to the query 504. Depending on specific implementations, each given one of the plurality of ranking scores 530 may range from "0" to "1", "0" to "100" or any other appropriate range for ranking a respective document. It should be noted that the range of possible values of the given ranking score is not a limiting feature of the present technology.

Let's assume that the ranking scores of the plurality of ranking scores 530 computed by the ranking MLA 162 range from "0" to "10". In one example, the ranking MLA 162 may compute that:

The first ranking score 531 is 6.0/10;
The second ranking score 532 is 9.0/10;
The third ranking score 533 is 8.0/10;
The fourth ranking score 534 is 7.3/10;
The fifth ranking score 535 is 6.6/10;
The sixth ranking score 536 is 5.4/10; and
The seventh ranking score 537 is 7.2/10.

For ease of understanding, since the ranking score 532 is the highest ranking score of the plurality of ranking scores 530, the document 512 is estimated to be the most relevant document of the plurality of documents 510 to the query 504. Since the ranking score 536 is the lowest ranking score of the plurality of ranking scores 530, the document 516 is estimated to be the least relevant document of the plurality of documents 510 to the query 504.

Figure 6:
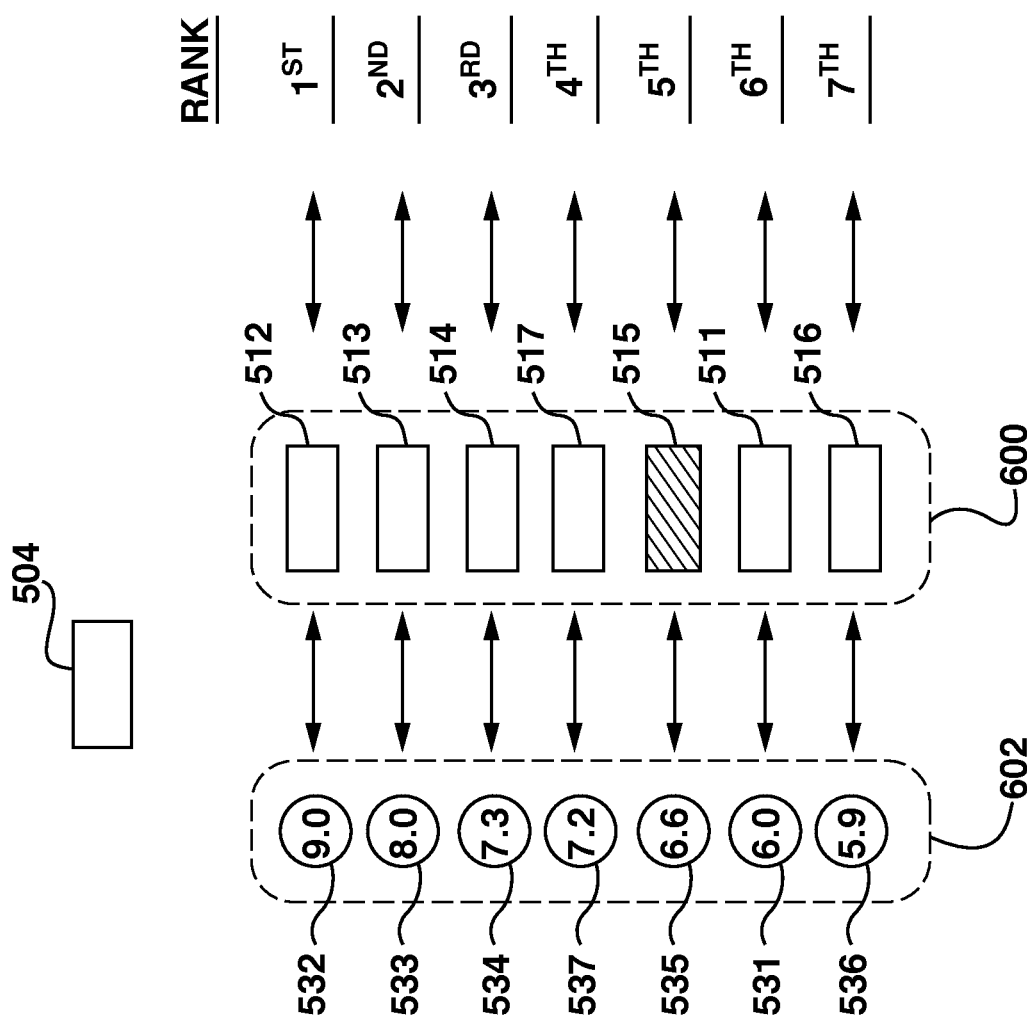
FIG. 6 depicts a list of ranked documents being ranked based on respective ranking scores in the context of a first scenario and according to some implementations of the present technology.

The ranking application 160 may be configured to rank all documents of the plurality of documents 510 based on their respectively associated ranking scores of the plurality of ranking scores 530. The ranking application 160 may rank all documents of the plurality of documents 510 based on a decreasing order of the respectively associated ranking scores. With reference to FIG. 6, all ranking scores of the plurality of ranking scores 530 are ranked by the ranking application 160 into a list of ranked ranking scores 602. As a result, all documents of the plurality of documents 510 may be ranked according to a respective rank of the respective ranking score in the list of ranked ranking scores 602.

Thus, all documents of the plurality of documents 510 may be ranked by the ranking application 160 into a list of ranked documents 600. For ease of understanding, after the ranking of all documents of the plurality of documents 510 based on the decreasing order of the respectively associated ranking scores:

The document 512 is ranked first in the list of ranked documents 600;

The document 513 is ranked second in the list of ranked documents 600;

The document 514 is ranked third in the list of ranked documents 600;

The document 517 is ranked fourth in the list of ranked documents 600;

The document 515 is ranked fifth in the list of ranked documents 600;

The document 511 is ranked sixth in the list of ranked documents 600; and

The document 516 is ranked seventh in the list of ranked documents 600.

In some embodiments of the present technology, the ranking server 132 may provide the user device 104 with the list of ranked documents 600. To that end, the ranking server 132 may be configured to generate a SERP data packet 195, as depicted in FIG. 1, which comprises information related to the list of ranked documents 600 and all information necessary to display the SERP with the plurality of documents 510 being ranked according to the list of ranked documents 600.

Without wishing to be bound to any specific theory, at least some embodiments of the present technology are based on the premise that some documents within the plurality of documents 510 may be associated with limited previous user feedback and that additional user feedback for those documents is desired. However, some of these documents may be ranked too low in the list of ranked documents 600 (due at least in part to the limited previous user feedback), which decreases a likelihood of the user interacting with these documents and to generate additional user feedback associated therewith.

Additional or the at least some embodiments of the present technology may be based on the premise that the ranking MLA 162 needs to be retrained and, therefore, an enhanced pool of training documents may be required for its retraining.

Therefore, in some embodiments of the present technology, instead of providing the SERP with the plurality of documents 510 ranked according to the list of ranked documents 600 to the user device 104, the ranking server 132 may be configured to amend at least some ranking scores of the plurality of ranking scores 530. To that end, the ranking server 132 may implement the prediction MLA 164.

Prior to describing some possible implementations and various functionalities of the prediction MLA 164, the training process 250 of the "untrained" prediction MLA 164 will now be described.

As previously mentioned, in some embodiments of the present technology and with reference to FIG. 2, the training phase of the ranking application 160 may comprise the training process 250. During the training process 250 of the "untrained" prediction MLA 164, the "untrained" prediction MLA 164 is supplied with a second set of training objects 212, the second set of training objects 212 including a plurality of training objects—such as a fourth training object 214, a fifth training object 216, a sixth training object 218, as well as other training objects potentially present within the second set of training objects 212. It should be understood that the second set of training objects 212 is not particularly limited and may include a number of additional training objects (such as hundreds, thousands or hundreds of thousands of additional training objects similar to the depicted ones of the fourth training object 214, the fifth training object 216, and the sixth training object 218).

The second set of training objects 212 may have been stored in the training database 136. Upon commencing the training process 250, the training server 130 may be configured to request the second set of training objects 212 from the training database 136. In response, the training database 136 may be configured to generate another training data packet (not depicted) comprising information associated with the second set of training objects 212. In some embodiments, each one of the second set of training objects 212 may be randomly selected from the pool of training documents. In other embodiments, each one of the set of training objects 202 may be algorithmically selected from the pool of training documents in order to provide a larger diversity of training objects during the training process 250. In yet another embodiment, each one of the set of training objects 202 may be selected from the pool of training documents based on specific criteria determined by an operator or based on a specific task or application of the prediction MLA 164. In additional embodiments, at least some objects of the set of training objects 202 and of the second set of objects 212 may be associated with identical training query-document pairs.

Figure 4:
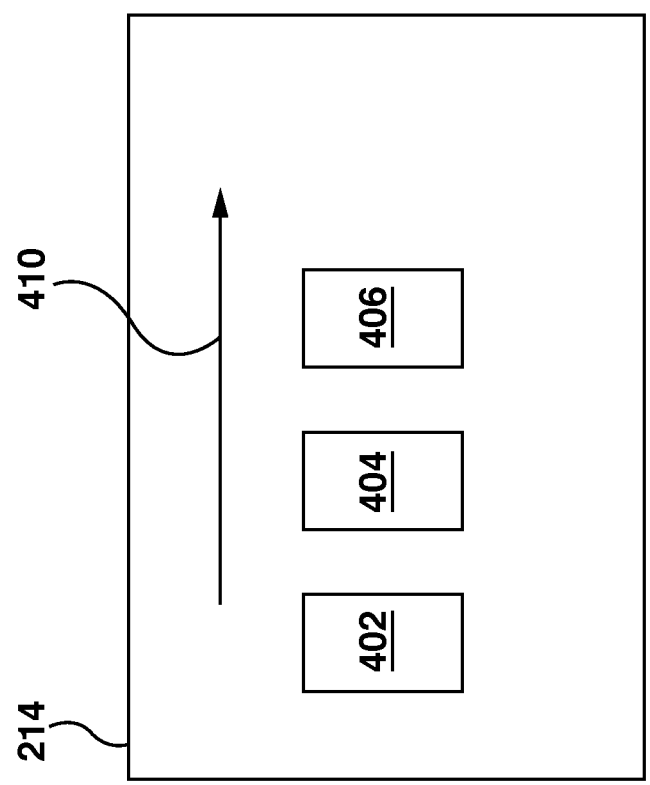
FIG. 4 depicts a training object used during a training procedure of a prediction MLA of the ranking application.

With reference to FIG. 4, which schematically depicts a given training object of the second set of training objects 212 (in this case, the fourth training object 214), using the example of the fourth training object 214, each training object 214, 216, 218 in the second set of training objects 212 comprises a respective query-document pair (which includes an indication of a fourth training query 402 and an associated fourth training document 404, which potentially is responsive to the training query 402) and a respective assessed class 406.

Generally speaking, the fourth training object 214 may be implemented similarly to the first training object 204 which is used to train the "untrained" ranking MLA 162. For example, the fourth training document 214 can also be said to be associated with a respective feature vector 410. However, unlike the training objects in the set of training objects 202, a respective user feedback data point related to each query-document pair in the second set of training objects 212 may be omitted.

Returning to the description of FIG. 2, as part of the training process 250, the "untrained" prediction MLA 164 executed by the ranking application 160 may analyze the second set of training objects 212 to derive a prediction MLA formula 220, which in a sense is based on hidden relationships between various components of each training object in the second set of training objects 212, such as between respective training queries, respective training documents and respective assessed classes.

In some embodiments of the present technology, the "untrained" prediction MLA 164 is trained via the training process 250 in order to compute a given class association value based on a given query-document pair. In other words, when the "untrained" prediction MLA 164 has been trained by the training process 250, the prediction MLA 164 may be inputted with the given query-document pair. In response, the prediction MLA 164 is configured to output (i.e., compute) the given class association value for the given document of the given query-document pair.

Generally speaking, the given class association value is a probability of the given document to be associated with a predetermined class of documents. The predetermined class of documents is determined by the operator of the ranking application 160 by selecting one of the plurality of the human assessed classes. Put another way, the operator may select one of the plurality of the human assessed classes that were used as class-labeling instructions for the human assessors during the class assessment of the training documents. Once the operator has selected one of the plurality of human assessed classes, the given class association value will be a probability of a respective document to be associated with that so-selected class.

For example, when the plurality of human assessed classes comprises "Bad", "Fair", "Good", "Excellent" and "Perfect" classes of documents, the operator of the ranking application 160 may configure the "untrained" prediction MLA 164 to output (i.e., compute) a probability of the given document to be associated with one of the "Bad", "Fair", "Good", "Excellent" and "Perfect" classes. As such, the operator may configure the "untrained" prediction MLA 164 to "learn" to predict a probability with which a given document from a given query-document pair is associated with the "Good" class, for example. In another example, the operator may configure the "untrained" prediction MLA 164 to "learn" to predict a probability with which the given document is associated with the "Excellent" class.

Depending on specific implementations, the given class association value may range from "0" to "1" or from "0" to "100". It should be noted that other ranges of class association values may be used depending on specific implementations of the present technology without departing from the scope thereof.

In summary, the training phase of the ranking application 160 comprises the training process 200 and the training process 250, both depicted in FIG. 2. During the training process 200, the "untrained" ranking MLA 162 is trained based on the set of training objects 202 in order to derive the ranking MLA formula 210. Each training object in the set of training objects 202 may comprise a respective query, a respective document, a respective assessed class and a respective previous user feedback data point. During the training process 250, the "untrained" prediction MLA 164 is trained based on the second set of training objects 212 in order to derive the prediction MLA formula 220. Each training object in the second set of training objects 212 may comprise a respective query, a respective document and a respective assessed class. In some embodiments, at least one training object from the set of training objects 202 may be associated with an identical query-document pair than another training object from the second set of training objects 212.

The in-use phase of the ranking application 160 will now be described with reference to FIGS. 5 to 12.

In some embodiments of the present technology, the ranking server 132 may be configured to provide the user of the user device 104 with a given amended list of ranked documents of the plurality of documents 510. How the ranking server 132 provides the given amended list of ranked documents to the user will be described using a couple of non-limiting examples. More specifically, for the purpose of illustrating the above, two scenarios will now be described of how the ranking server 132 can rank and provide documents of the plurality of documents 510 to the user of the user device 104 during the in-use phase of the ranking application 160.

Scenario 1: Ranking Based on Ranking Scores and Class Association Values

In this scenario, the ranking server 132 may input into the prediction MLA 164 the query-document information 502 comprising the query 504 and the plurality of documents 510 as depicted in FIG. 5. As previously mentioned, in the query-document information 502 each query-document pair comprises the query 504 and a respective document of the plurality of documents 510. In this example, the ranking server 132 may be configured to input seven query-document pairs. Each query-document pair inputted into the prediction MLA 164 during the in-use phase will be referred herein as a "prediction input set".

The prediction MLA 164 may be configured to output (i.e., compute) a given class association value for each prediction input set that was inputted therein by the ranking server 132. In one example, the prediction MLA 164 may compute:

A first class association value 541 for a first prediction input set that comprises the query 504, and the document 511;

A second class association value 542 for a second prediction input set that comprises the query 504 and the document 512;

A third class association value 543 for a third prediction input set that comprises the query 504 and the document 513;

A fourth class association value 544 for a fourth prediction input set that comprises the query 504 and the document 514;

A fifth class association value 545 for a fifth prediction input set that comprises the query 504 and the document 515 (i.e., the at least one document associated with limited previous user feedback);

A sixth class association value 546 for a sixth prediction input set that comprises the query 504 and the document 516; and A seventh class association value 547 for a seventh prediction input set that comprises the query 504 and the document 517.

As it will be described herein below, each class association value may allow amending a respective ranking score of a respective document of the plurality of documents 510.

As previously mentioned, each given class association value is a probability of a given document to be associated with (i.e. to belong to) a particular (predetermined) class from the plurality of human assessed classes. Depending on specific implementations, each given one of the plurality of class association values 540 may range from "0" to "1", "0" to "100" or any other appropriate range. It should be noted that the range of all possible class association values is not a limiting feature of the present technology.

Figure 7:
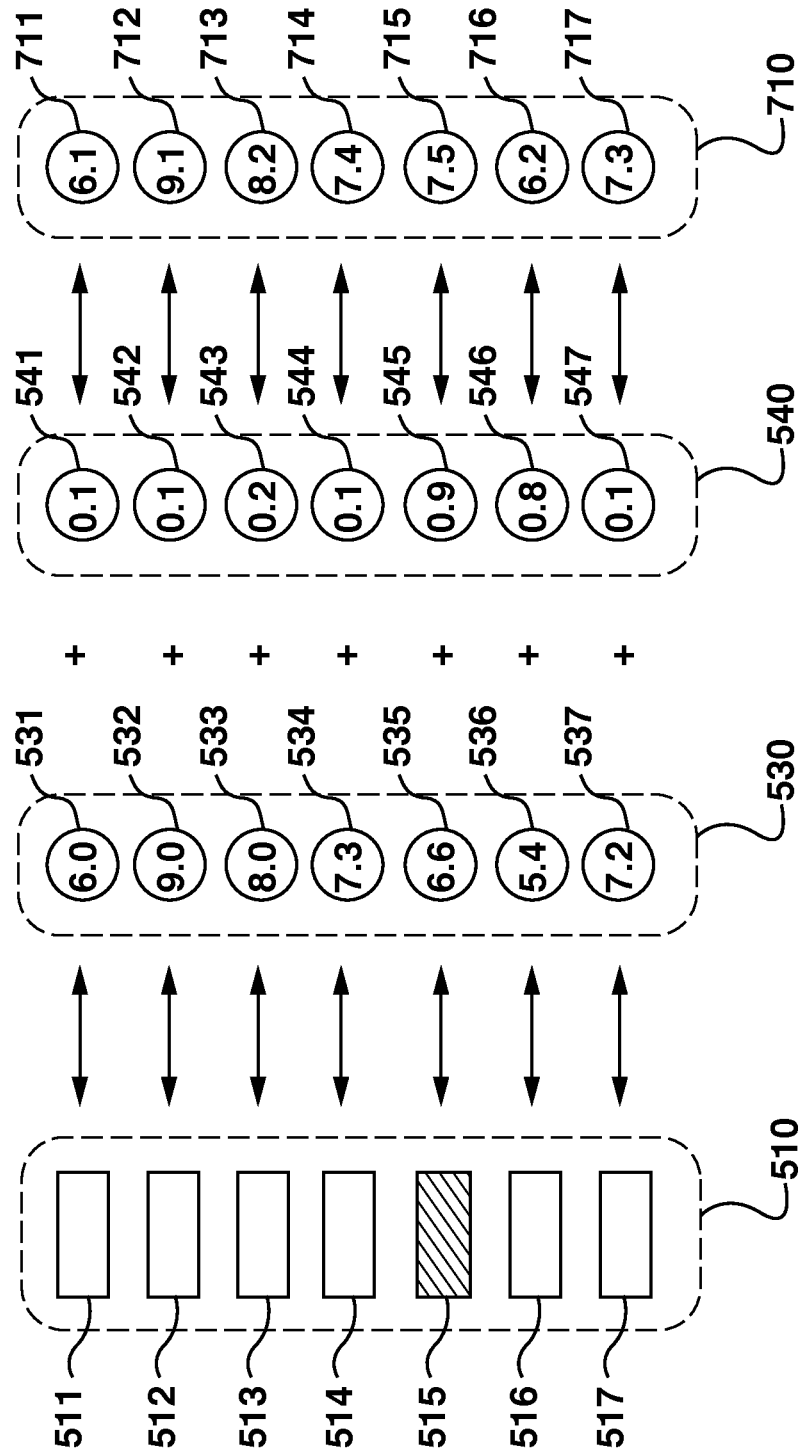
FIG. 7 depicts a process for computation of amended ranking scores for the plurality of documents in the context of a second scenario and according to some implementations of the present technology.

Let's assume that the plurality of human assessed classes that was used as class-labeling instructions comprises the following classes of documents: "Bad", "Fair", "Good", "Excellent" and "Perfect". Also, let's assume that the operator of the ranking application 160 determined that the predetermined class is the "Good" class in the plurality of human assessed classes. This means that the prediction MLA 164 may have been trained and is now configured to compute a respective class association value for each one of the documents of the plurality of documents 510 and where the respective class association value is the probability of the respective document of the plurality of documents 510 to be associated with the "Good" class of documents. For example, as depicted in FIG. 7, the prediction MLA 164 may compute that:

The first class association value 541 is 0.1/1;
The second class association value 542 is 0.1/1;
The third class association value 543 is 0.2/1;
The fourth class association value 544 is 0.1/1;
The fifth class association value 545 is 0.9/1;
The sixth class association value 546 is 0.8/1; and
The seventh class association value 547 is 0.1/1.

For explanation purposes only, since the class association values 541, 542, 543, 544 and 547 are low, the documents 511, 512, 513, 514 and 517 are unlikely to be associated with the "Good" class of documents. Since the fifth class association value 545 is high, this means that the document 515 is likely to be associated with the "Good" class of documents. Since the sixth class association value 546 is superior to the class association values 541, 542, 543, 544 and 547, the document 516 is more likely to be associated with the "Good" class of documents than the documents 511, 512, 513, 514 and 517. Also, since the sixth class association value 546 is inferior to the fifth class association value 545, the document 516 is less likely to be associated with the "Good" class of documents than the document 515.

In some embodiments of the present technology, it is contemplated that the ranking application 160 may be configured to compute a respective amended ranking score for each query-document pair in the query-document information 502. The respective amended score may be computed based on a respective ranking score and a respective class association value. Generally speaking, a given amended ranking score may be indicative of an amended relevance of a respective document of the plurality of documents 510 to the query 504. In other words, the estimated relevance of a given document (i.e., the respective ranking score) may be amended based on a probability of that document to be associated with the predetermined class of documents.

In some embodiments, a given amended ranking score for a respective document may be computed by the ranking application 160 as a sum of the respective ranking score computed by the ranking MLA 162 and of the respective class association value computed by the prediction MLA 164, as depicted in FIG. 7. For example, the ranking application 160 may compute that:

A first amended ranking score 711 is 6.1/10;
A second amended ranking score 712 is 9.1/10;
A third amended ranking score 713 is 8.2/10;
A fourth amended ranking score 714 is 7.4/10;
A fifth amended ranking score 715 is 7.5/10;
A sixth amended ranking score 716 is 6.2/10; and
A seventh amended ranking score 717 is 7.3/10.

Put another way, the ranking application 160 may be configured to compute a plurality of amended ranking scores 710 based on the plurality of ranking scores 530 and the plurality of class association values 540. The plurality of amended ranking scores 710 comprises a respective amended ranking score for each document of the plurality of documents 510.

In some embodiments of the present technology, the ranking application 160 may be configured to rank all documents of the plurality of documents 510 based on their respectively associated amended ranking scores of the plurality of amended ranking scores 710. The ranking application 160 may rank all documents of the plurality of documents 510 based on a decreasing order of the respectively associated amended ranking scores.

Figure 8:
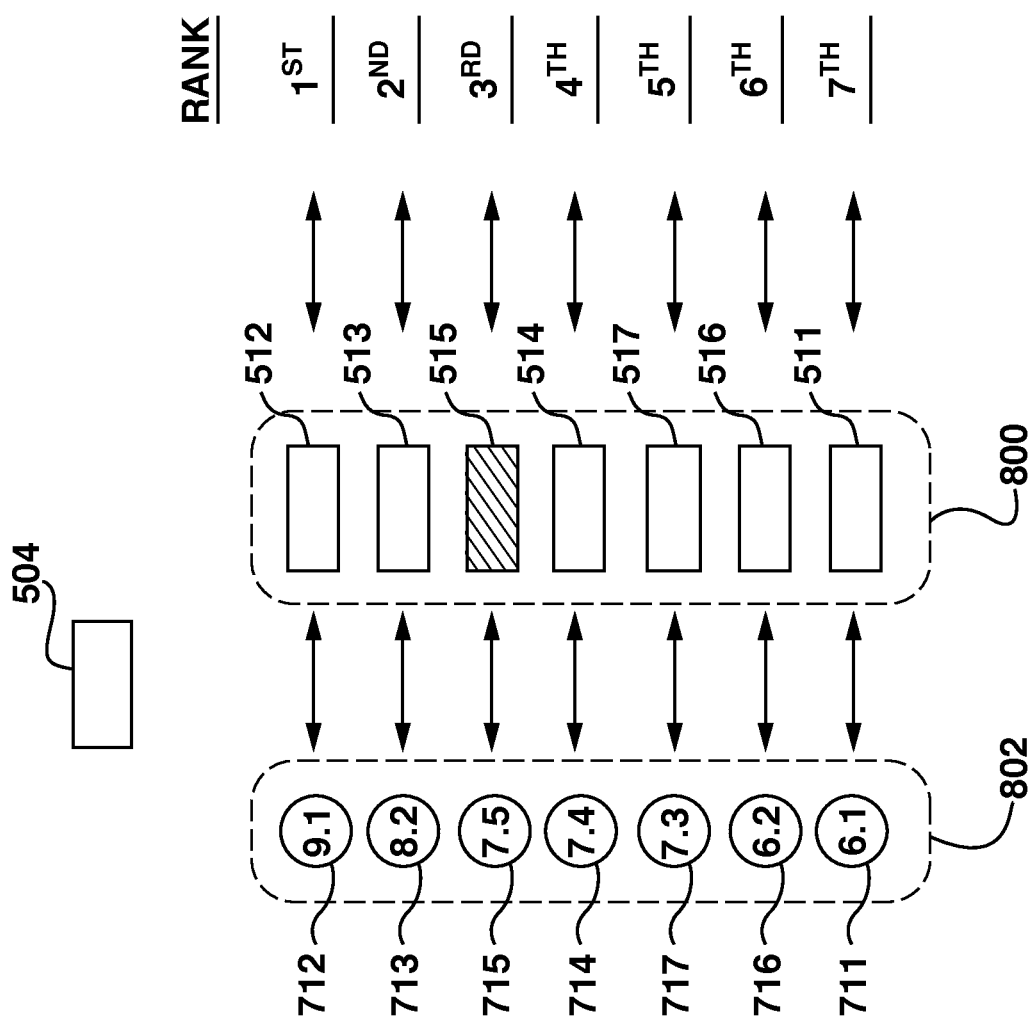
FIG. 8 depicts a first amended list of ranked documents being ranked based on respective amended ranking scores of FIG. 7.

With reference to FIG. 8, all amended ranking scores of the plurality of amended ranking scores 710 are ranked by the ranking application 160 into a first list of ranked amended ranking scores 802. As a result, all documents of the plurality of documents 510 may be ranked according to a respective rank of the respective amended ranking score in the first list of ranked amended ranking scores 802.

Thus, all documents of the plurality of documents 510 may be ranked by the ranking application 160 into a first amended list of ranked documents 800. For ease of understanding, after the ranking of documents of the plurality of documents 510 based on the decreasing order of the respectively associated amended ranking scores of the first list of ranked amended ranking score 802:

The document 512 is ranked first in the first amended list of ranked documents 800;
The document 513 is ranked second in the first amended list of ranked documents 800;
The document 515 is ranked third in the first amended list of ranked documents 800;
The document 514 is ranked fourth in the first amended list of ranked documents 800;
The document 517 is ranked fifth in the first amended list of ranked documents 800;
The document 516 is ranked sixth in the first amended list of ranked documents 800; and
The document 511 is ranked seventh in the first amended list of ranked documents 800.

In some embodiments of the present technology, the ranking server 132 may provide the user device 104 with the first amended list of ranked documents 800. To that end, the ranking server 132 may be configured to generate the SERP data packet 195, as depicted in FIG. 1, which comprises information related to the first amended list of ranked documents 800 (as opposed to the list of ranked documents 600) and all information necessary to display the SERP with the plurality of documents 510 being ranked according to the first amended list of ranked documents 800.

Figure 9:
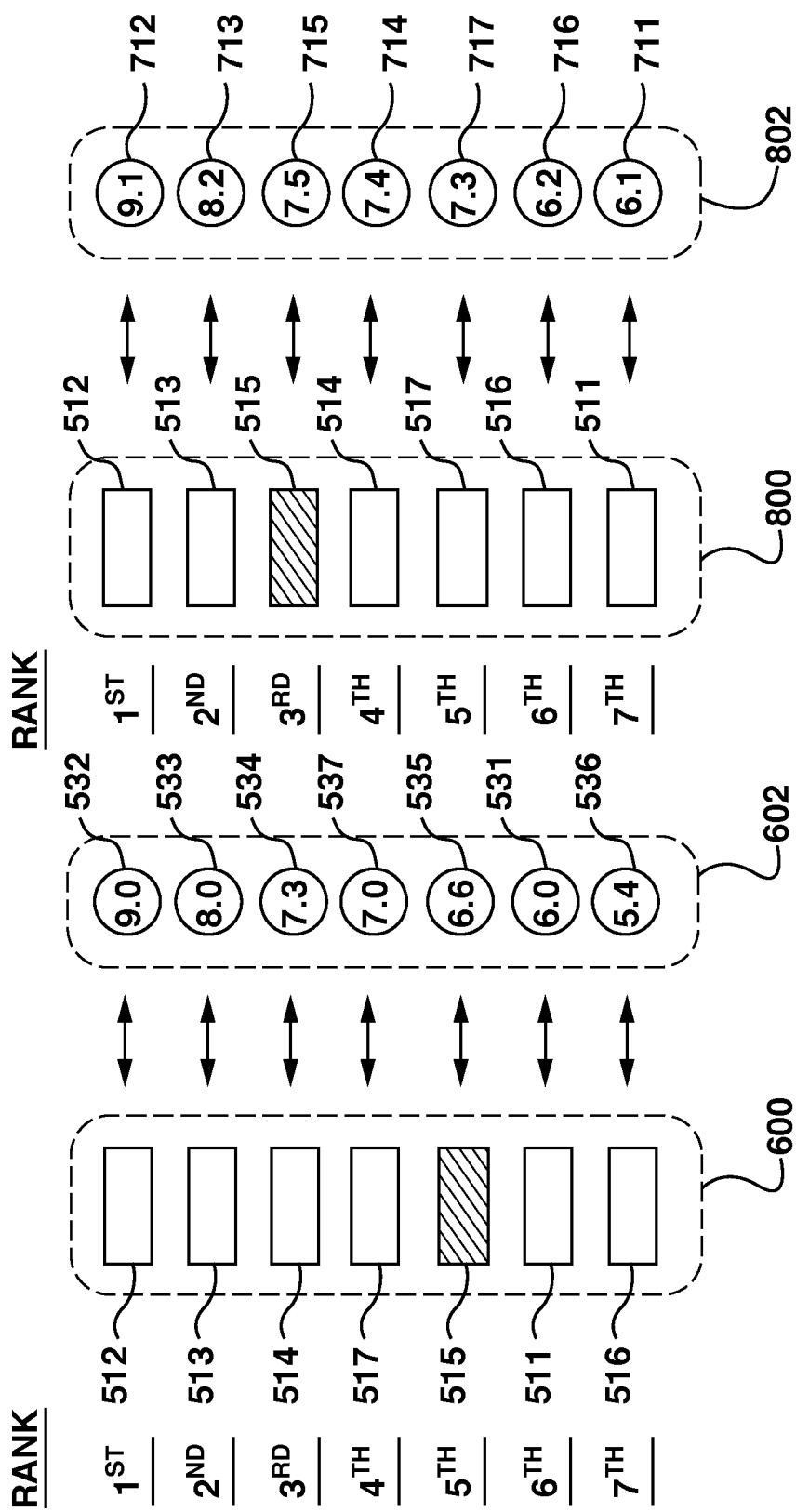
FIG. 9 depicts an illustration of a comparison between original ranks of documents in the list of ranked documents of FIG. 6 and amended ranks of documents in the first amended list of ranked documents of FIG. 8.

With reference to FIG. 9, there is depicted an illustration of a comparison between original ranks of each one of the plurality of documents 510 (i.e., according to the list of ranked documents 600) and amended ranks of each one of the plurality of documents 510 (i.e., according to the first amended list of ranked documents 800). It should be noted that the original ranks of at least some documents have changed.

More specifically, the documents 512 and 513 are ranked first and second, respectively, in both the list of ranked documents 600 and the first amended list of ranked documents 800. This means that they are the most relevant documents according to both the list of ranked documents 600 and the first amended list of ranked documents 800. In other words, the ranking server 132 may amend original ranks of some documents based on their class association values without necessarily amending original ranks of most relevant documents. Such a feature of the present technology may be desirable if the operator of the ranking application wishes to "shuffle" ranks of some documents without necessarily having a negative effect on user satisfaction with the SERP being provided thereto.

Also, the document 515 is ranked fifth in the list of ranked documents 600 and is ranked third in the first amended list of ranked documents 800. Therefore, a magnitude of change of the original rank of the document 515 is "2", which is an absolute difference between the original and the amended rank of the document 515. This means that the amended ranking score 715 is instrumental in causing a change of the original rank of the document 515. Such a feature of the present technology may be desirable if the operator of the ranking application 160 wishes to gather new user feedback associated with the document 515, for example, since the document 515 is now ranked higher than originally.

Furthermore, the document 516 is ranked seventh in the list of ranked documents 600 and is ranked sixth in the first amended list of ranked documents 800. Therefore, a magnitude of change of the original rank of the document 516 is "1", which is an absolute difference between the original and the amended rank of the document 516.

In other words, a given magnitude of change of the original rank of a given document is an absolute difference between the original rank of the given document (i.e., in the list of ranked documents 600) and the amended rank of the given document (i.e., in the first amended list of ranked documents 800).

In some embodiments of the present technology, it's contemplated that a given class association value is computed by the prediction MLA 164 in order to amend the original rank of a respective document. In other words, the given class association value may be instrumental in increasing a magnitude of change of the original rank of the respective document.

In some embodiments of the present technology, any of the class association values (e.g. class association values 541-547) that are associated with the documents, respectively, may be determined based on user feedback (user selection of a respective document, a user complaint of a document quality). Additionally, the class association values may be determined based on meta-attributes of the document, respectively: a document type (a video fragment, an image, a song), meta-tags of a document, etc.

Recalling that the class association values 545 and 546 that are associated with the documents 515 and 516, respectively, are comparatively high if compared to class association values of the documents 511, 512, 513, 514 and 517, it can be said that the magnitudes of change of the original ranks of the documents 515 and 516 were increased at least partially due to the fact that the class association values 545 and 546, respectively, are superior to the class association values 541, 542, 543, 544, and 547.

However, it should be understood that although a given class association value may be high for a given document, the magnitude of change of the original rank still depends on the amended ranking scores of other documents of the plurality of documents 510. Nevertheless, the higher a given class association value is for a given document, the more likely that the magnitude of change of the original rank of the given document will be high. This means that, generally speaking, documents associated with higher class association values are more likely to have high magnitudes of change of their original ranks in comparison with documents associated with lower class association values. Put another way, it is contemplated that documents that have high probabilities of being associated with the predetermined class of documents are more likely to have high(er) magnitudes of change of their original ranks in comparison with documents that have low probabilities of being associated with the predetermined class of documents.

In some embodiments of the present technology, it is contemplated that amending ranks of documents on a displayed SERP that are likely to be part of a pre-determined class of documents may increase an amount of various interactions that users have with these documents without necessarily having a negative effect on user satisfaction with the displayed SERP. Indeed, as seen in FIG. 9, the original rank of the document 515 (which is associated with limited previous user feedback) was amended although the original ranks of the most relevant documents 512 and 513 remained unchanged.

Scenario 2: Ranking Based on the Ranking Scores and Weighted Class Association Values In other embodiments of the present technology, a given amended ranking score for a respective document may be computed by the ranking application 160 as a weighted sum of the respective ranking score computed by the ranking MLA 162 and of the respective class association value computed by the prediction MLA 164. In other words, the ranking application 160 may be configured to compute each amended ranking score based on the following equation:

$$ARS_d = RS_d + W_d * CAV_d, \text{ where } W_d = k*mp_d \text{ and } mp_d \in [-1,1]$$ Equation (1)

Where:

$ARS_d$ is the amended ranking score associated with a given document d of the plurality of documents 510, $RS_d$ is the ranking score associated with the given document d and computed by the ranking MLA 162, $CAV_d$ is the class association value associated with the given document d and computed by the prediction MLA 164; and $W_d$ is a weighting parameter computed by the ranking application 160 for the given document d.

In some embodiments, the weighting parameter $W_d$ may be implemented in order to "normalize" class association values with respect to ranking scores. This normalisation effect of the weighting factor $W_d$ may be attributed to a normalization constant k based on which the weighting factor $W_d$ is computed.

The normalization effect may be required if ranges of class association values and of ranking scores are considered by the operator as "ill-matched". For example, if the range of ranking scores is between "0" and "10" and the range of class association values is between "0" and "100", these ranges may be considered as ill-matched since a given class association value will outweigh a respective ranking score during the computation of a respective amended ranking score. Therefore, in this example, the normalisation constant k based on which the weighting factor $W_d$ is computed may be "0.01", for example, in order to "normalize" the range of the class association values. It should be noted that depending on specific implementations, the normalisation constant k may be empirically selected or selected by any other manner judged appropriate by the operator of the ranking application 160.

In other embodiments, the weighting parameter $W_d$ may be instrumental in controlling a magnitude of change of an original rank of a given document. This controlling effect of the weighting factor $W_d$ may be attributed to a modulating parameter mp based on which the weighting factor $W_d$ is computed. The modulating parameter mp may be any random value between −1 and 1. In some implementations, the modulating parameter mp may be uniformly selected between −1 and 1 for each document of the plurality of documents 510.

In some embodiments, this controlling effect may be required if the operator desires not only to potentially increase original ranks of given documents based on their respective class association values, but also to be able to potentially decrease original ranks of documents based on their respective class association values. Indeed, the modulating parameter mp of a given document may be positive or negative. As a result, if a respective class association value is multiplied by a negative modulating parameter mp, the respective amended ranking score of the given document will be inferior to the ranking score of the given document. Therefore, the amended rank of the given document is more likely to decrease in comparison with the original rank of the given document.

In other embodiments, this controlling effect may also be required if the operator desires to reduce the influence of class association values on the respective magnitudes of change of the original ranks. As previously mentioned, a given class association value may be instrumental in increasing a respective magnitude of change of the original rank of the respective document. Indeed, the given class association value is added to the ranking score, which may result in a change of the original rank of the respective document. The higher the given class association value, the more likely that the respective magnitude of change of the original rank will increase. However, since in this scenario the given class association value is weighted (i.e., multiplied) by a given modulating parameter mp being between −1 and 1, the given ranking score will be equally or less amended if compared to when the given class association value is not weighted. Therefore, the magnitude of change of the original rank of the respective document is more likely to be reduced when the class association value is weighted by the given modulating parameter mp compared to when the given class association value is not weighted thereby.

Figure 10:
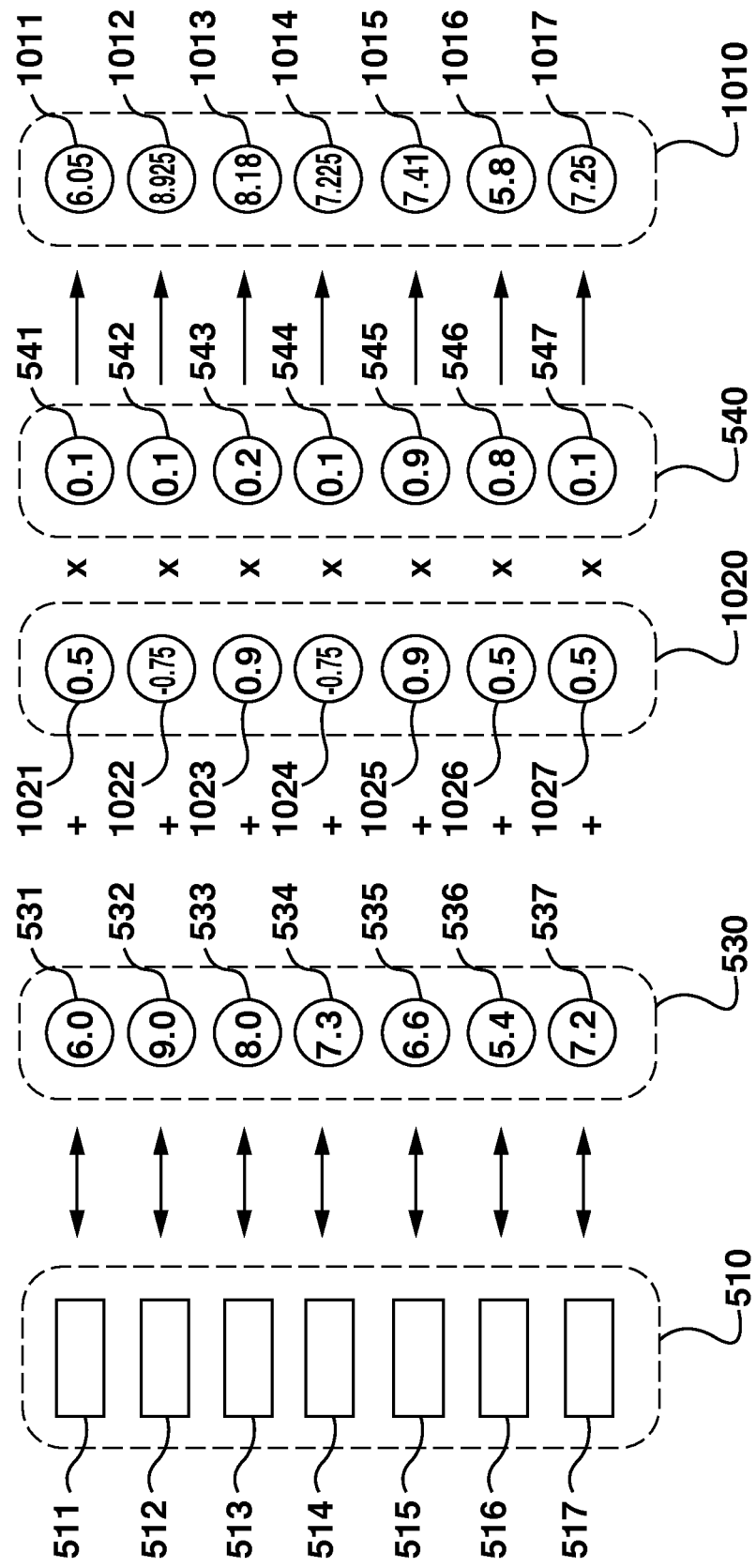
FIG. 10 depicts a process for computation of amended ranking scores for the plurality of documents in the context of a third scenario and according to some implementations of the present technology.

With reference to FIG. 10, an example of the use of equation (1) by the ranking application 160 for computing a plurality of amended ranking scores 1010 will now be described. Let's assume that the ranking MLA 162 computed the plurality of ranking scores 530 and the prediction MLA 164 computed the plurality of class association values 540. However, unlike the computation procedures of Scenarios 1 and 2, the plurality of amended ranking scores 1010 is computed based on the plurality of ranking scores 530, the plurality of class association values 540 and a plurality of weighting parameters 1020.

For the sake of simplicity let's also assume that the ranges of class association values and ranking scores have been appropriately selected and, therefore, the normalization constant k may be equal to "1". As a result, since a respective weighting parameter $W_d$ is a product of a respective normalisation constant k and of a respective modulating parameter mp, let's therefore assume, for ease of explanation only, that the plurality of weighting parameters 1020 is a plurality of modulating parameters 1020.

As previously mentioned, each one of the plurality of modulating parameters 1020 has been uniformly selected between −1 and 1 for each one of the plurality of documents 510. In one example, the ranking application 160 may compute that:

A first modulating parameter 1021 is 0.5;
A second modulating parameter 1022 is −0.75;
A third modulating parameter 1023 is 0.9;
A fourth modulating parameter 1024 is −0.75;
A fifth modulating parameter 1025 is 0.9
A sixth modulating parameter 1026 is 0.5; and
A seventh modulating parameter 1027 is 0.5.

For explanation purposes only, since modulating parameters 1021, 1023, 1025, 1026 and 1027 of the plurality of modulating parameters 1020 are positive, their respective amended ranking scores 1011, 1013, 1015, 1016 and 1017 of the plurality of amended ranking scores 1010 are superior to their respective ranking scores 531, 533, 535, 536 and 537.

In another example, since modulating parameters 1022 and 1024 of the plurality of modulating parameters 1020 are negative, their respective amended ranking scores 1012 and 1014 of the plurality of amended ranking scores 1010 are inferior to their respective ranking scores 532 and 534.

Therefore, it's contemplated that in some embodiments a given modulating parameter is instrumental in causing the respective amended ranking score to be either superior or inferior to the respective ranking score depending on a sign of the given modulating parameter. In other words, the given modulating parameter may allow not only increasing but also decreasing the respective ranking score.

In some embodiments of the present technology, the ranking application 160 may be configured to rank all documents of the plurality of documents 510 based on their respectively associated amended ranking scores of the plurality of amended ranking scores 1010. The ranking application 160 may rank the documents of the plurality of documents 510 based on a decreasing order of the respectively associated amended ranking scores.

Figure 11:
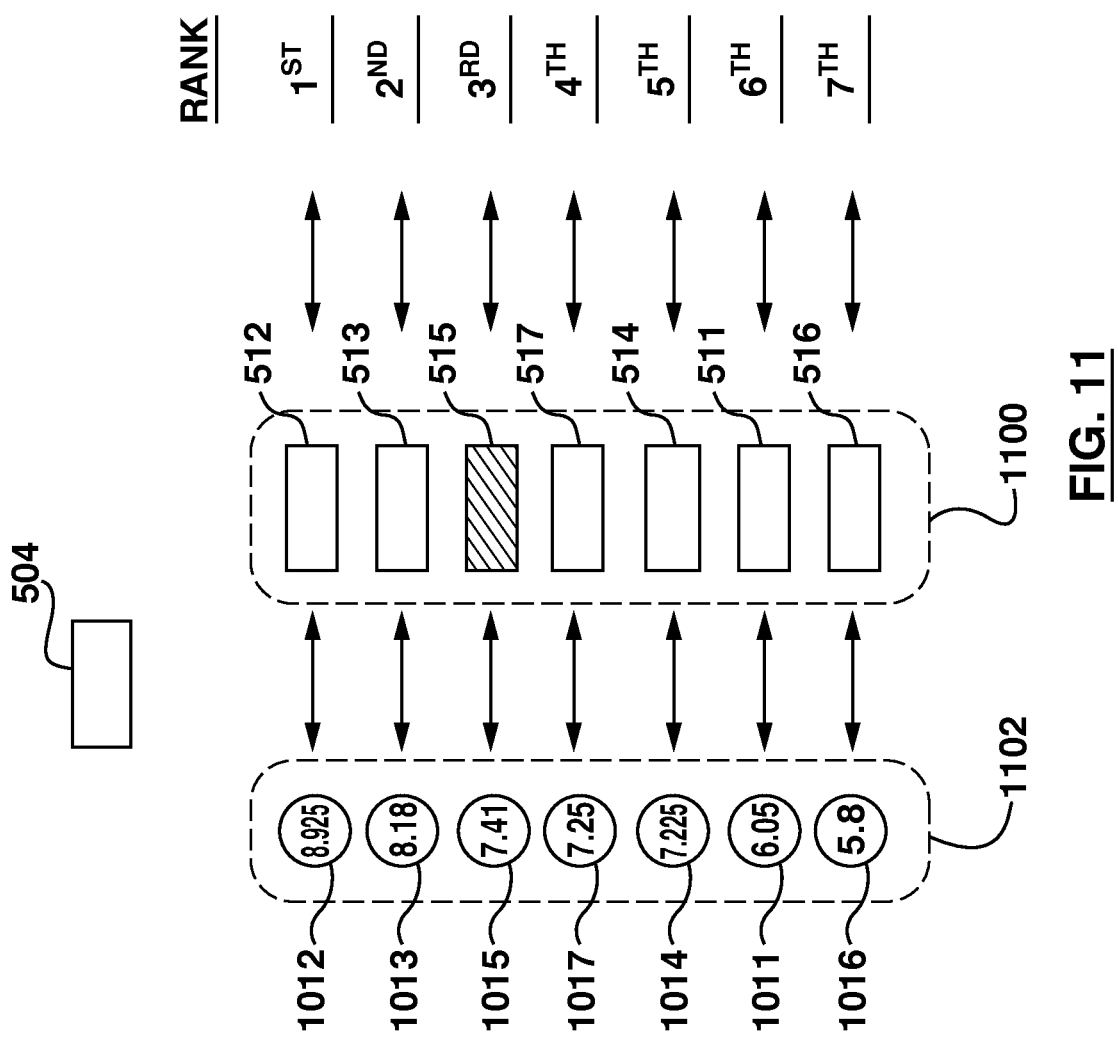
FIG. 11 depicts a second amended list of ranked documents being ranked based on respective amended ranking scores of FIG. 10.

With reference to FIG. 11, all amended ranking scores of the plurality of amended ranking scores 1010 are ranked by the ranking application 160 into a second list of ranked amended ranking scores 1102. As a result, all documents of the plurality of documents 510 may be ranked according to a respective rank of the respective amended ranking score in the second list of ranked amended ranking scores 1102.

Thus, all documents of the plurality of documents 510 may be ranked by the ranking application 160 into a second amended list of ranked documents 1100. For ease of understanding, after the ranking of documents of the plurality of documents 510 based on the decreasing order of the respectively associated amended ranking scores of the second list of ranked amended ranking score 1102:

The document 512 is ranked first in the second amended list of ranked documents 1100;
The document 513 is ranked second in the second amended list of ranked documents 1100;
The document 515 is ranked third in the second amended list of ranked documents 1100;
The document 517 is ranked fourth in the second amended list of ranked documents 1100;
The document 514 is ranked fifth in the second amended list of ranked documents 1100;
The document 511 is ranked sixth in the second amended list of ranked documents 1100; and
The document 516 is ranked seventh in the second amended list of ranked documents 1100.

In some embodiments of the present technology, the ranking server 132 may provide the user device 104 with the second amended list of ranked documents 1100. To that end, the ranking server 132 may be configured to generate the SERP data packet 195, as depicted in FIG. 1, which comprises information related to the second amended list of ranked documents 1100 (as opposed to the list of ranked documents 600 or the first amended list of ranked documents 800) and all information necessary to display the SERP with the plurality of documents 510 being ranked according to the second amended list of ranked documents 1100.

Figure 12:
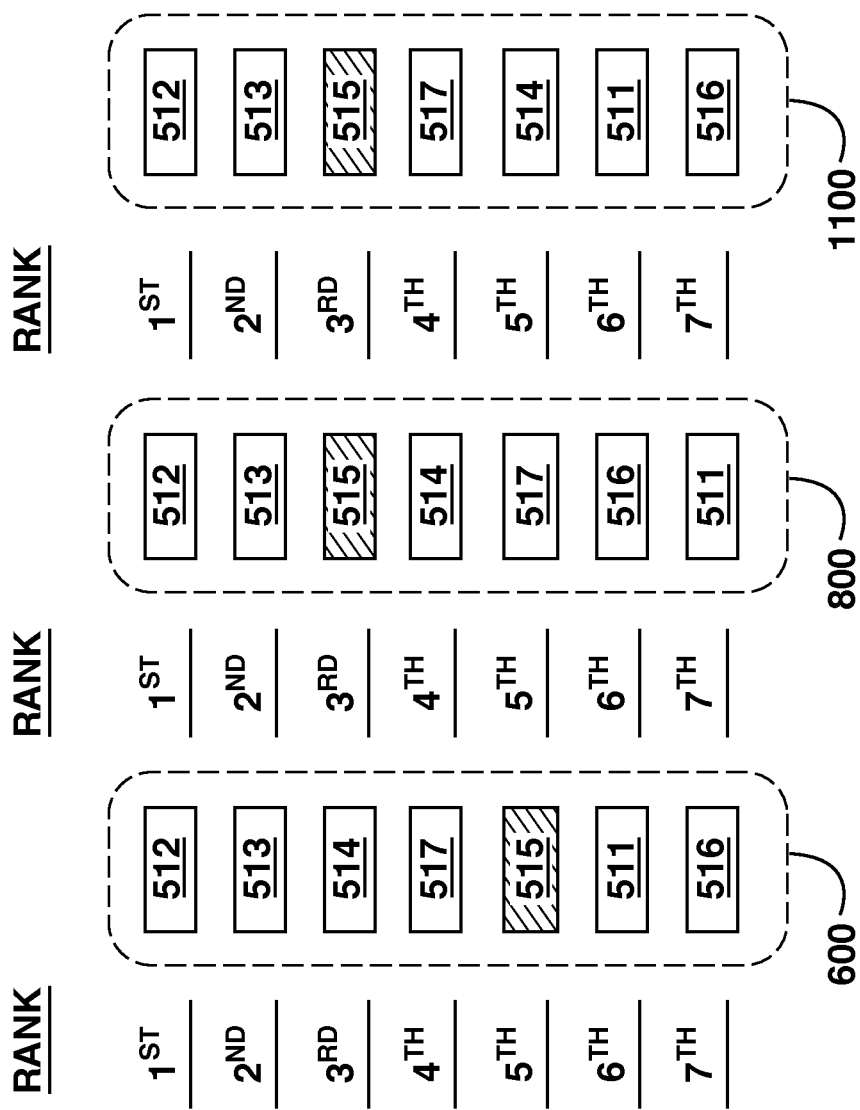
FIG. 12 depicts an illustration of a comparison between original ranks of documents in the list of ranked documents of FIG. 6, amended ranks of documents in the first amended list of ranked documents of FIG. 8 and amended ranks of documents in the second amended list of ranked documents of FIG. 11.

With reference to FIG. 12, there is depicted an illustration of a comparison between the original ranks of the plurality of documents 510 according to the list of ranked documents 600, the amended ranks of the plurality of documents 510 according to the first amended list of ranked documents 800 and the amended ranks of the plurality of documents 510 according to the second amended list of ranked documents 1100. It should be noted that the original ranks of at least some documents have been changed.

More specifically, the documents 512 and 513 are ranked first and second, respectively, in the list of ranked documents 600, the first amended list of ranked document 800 and the second amended list of ranked documents 1100. This means that the documents 512 and 513 are the most relevant documents of the plurality of documents 510 according to the list of ranked documents 600, the first amended list of ranked document 800 and the second amended list of ranked documents 1100. As a result, some embodiments of the present technology allow amending original ranks of some documents without amending the original ranks of the most relevant documents to the query 504.

Also, the document 515 is ranked higher in the first and second amended lists of ranked documents 800 and 1100 compared to the list of ranked documents 600. This magnitude of change of the original rank of the document 515 may be at least partially caused by the respective class association value 545. Indeed, since the probability of the document 515 to be associated with the "Good" class of documents is high, the magnitude of change of the original rank of the document 515 is also high; in this case, the magnitude of change of the original rank of the document 515 is the highest magnitude of change amongst all the documents of the plurality of documents 510.

Further, the document 516 is associated with a magnitude of change of the original rank of "1" in the first amended list of ranked documents 800. However, the document 516 is associated with a magnitude of change of the original rank of "0" in the second amended list of ranked documents 1100. This reduction of the magnitude of change of the original rank of the document 516 from "1" to "0", between the first amended list of ranked documents 800 and the he second amended list of ranked documents 1100, is at least partially due to the sixth modulating parameter 1026 which is instrumental in controlling the magnitude of change of the original rank of the document 516.

Following the provision of the SERP data packet 195 to the user device 104, the in-use phase of the ranking application 160 may be considered as terminated.

As previously mentioned and with reference to FIG. 5, the document 515 is associated with the previous user feedback data point 525 which is considered as limited previous user feedback. This means that the users of the search engine have not previously "interacted" or "explored" sufficiently the document 515. It's contemplated that in some embodiments of the present technology, new user feedback for the document 515 is desired.

As shown in FIG. 12, the amended rank of the document 515 in both the first and second amended lists of ranked documents 800 and 1100 is superior to the original rank of the document 515 in the list of ranked documents 600. Therefore, in order to increase the likelihood of user interactions with the document 515, the ranking server 132 may provide the SERP data packet 195, as depicted in FIG. 1, which comprises information related to any one of the first and second amended lists of ranked documents 800 and 1100 and all information necessary to trigger the display of the SERP with the plurality of documents 510 being ranked according to the any one of the first and second amended lists of ranked documents 800 and 1100.

As a result of providing the plurality of documents 510 ranked according to any one of the first and second amended lists of ranked documents 800 and 1100, the user device 104 may display to the user the SERP with the document 515 being ranked third on the SERP as opposed to the displaying to the user the SERP with the document 515 being ranked fifth on the SERP.

Indeed, since the document 515 is ranked higher in any one of the first and second amended lists of ranked documents 800 and 1100 than in the list of ranked documents 600, the likelihood of user interaction with the document 515 may increase (when the user is presented with any one of the first and second amended lists of ranked documents 800 and 110 in comparison to being presented with the list of ranked documents 600) since the user is more likely to select the document 515 when it's ranked third than when it's ranked fifth. It's contemplated that a change of the original rank of the document 515 may be instrumental in increasing the likelihood of user interaction with the document 515.

The user of the user device 104 may interact with the document 515 on the SERP. In some embodiments, the ranking server 132 may be configured to record and gather the new user feedback, which is provided by the user of the user device 104, associated with the document 515 ranked according to the amended ranking score 715 (i.e., according to the first amended list of ranked documents 800) or the amended ranking score 1015 (i.e., according to the second amended list of ranked documents 1100). Therefore, it can be said that the document 515 may now be associated with enhanced previous user feedback which includes the previous user feedback data point 525 (i.e., the limited previous user feedback) and the new user feedback gathered following the user interaction with the document 515 being ranked third on the SERP.

In additional embodiments, the ranking server 132 may be configured to store the new user feedback associated with the document 515 in the search database 134 and/or in the training database 136. Alternatively, the ranking server 132 may update the previous user feedback data point 525 by associating and storing the new user feedback with the previous user feedback 525. In other words, the ranking 132 server may store the enhanced user feedback in association with the document 515.

In yet another embodiment of the present technology, since the document 515 is now associated with enhanced user feedback, as opposed to being associated with the previous user feedback data point 525 (i.e., the limited previous user feedback), the document 515 may be used during "retraining" of the ranking MLA 162. Indeed, the ranking server 132 may be configured to request a human assessor to assign an assessed class to the document 515 from the plurality of human assessed classes and store the so-assigned assessed class in association with the document 515. Alternatively, a given assessed class could have been already assigned by the human assessor and previously stored in association with the document 515.

Therefore, a new training object may be generated which comprises the query 504, the document 515, the enhanced user feedback (i.e., the previous user feedback data point 545 and the new user feedback) and the so-assigned assessed class. As a result, the ranking MLA 162 may be "retrained" based on an enhanced set of training objects that includes the set of training objects 202 and the new training object associated with the document 515.

Figure 13:
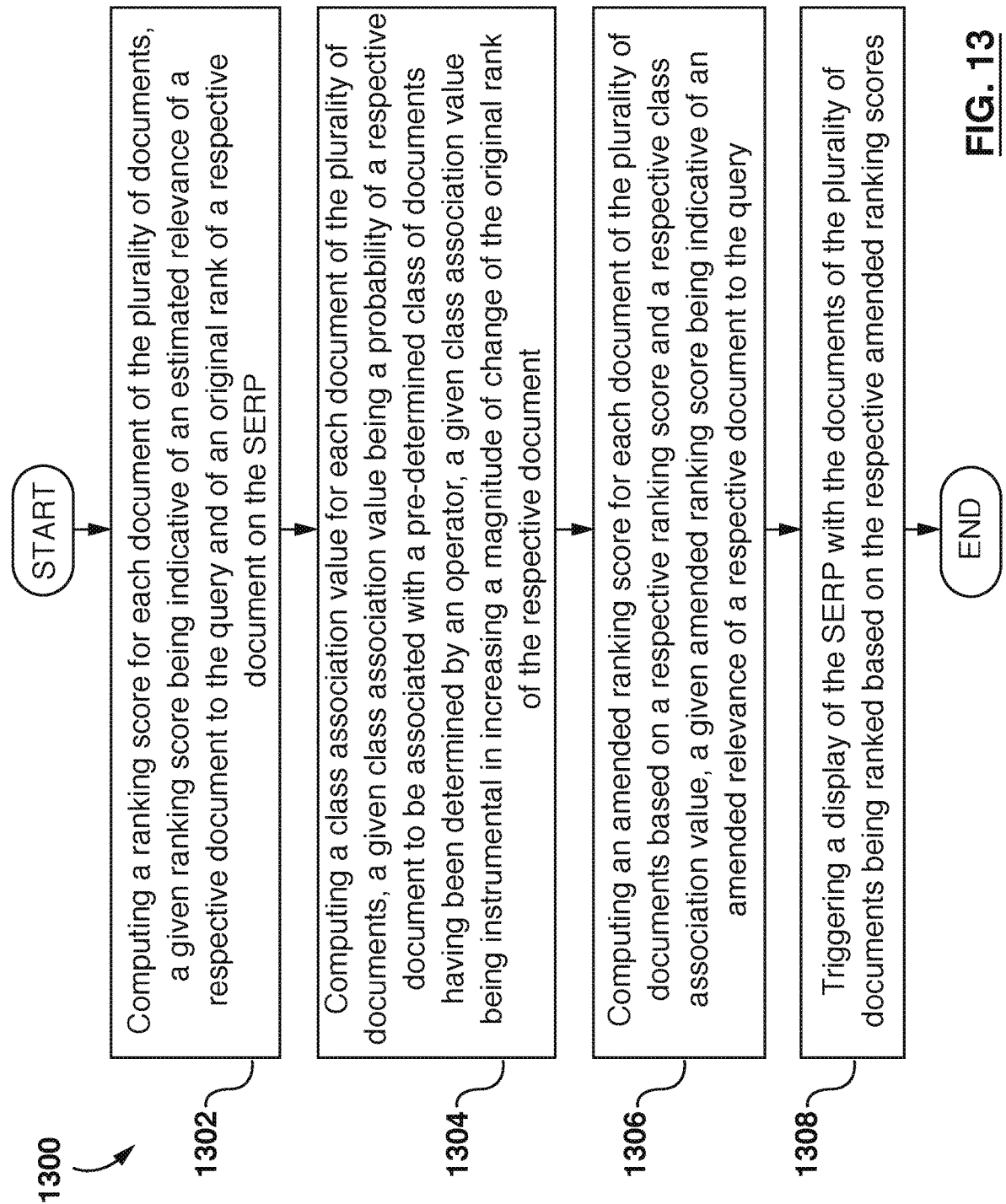
FIG. 13 schematically illustrates a flow chart of a method of ranking a plurality of documents according to some implementations of the present technology.

In some embodiments of the present technology, the ranking server 132 may be configured to execute a method 1300, a flow chart of which is schematically depicted in FIG. 13. Various steps of the method 1300 will now be described in further detail herein below.

STEP 1302: Computing a Ranking Score for Each Document of the Plurality of Documents The method 1300 begins with the ranking server 132 computing a respective ranking score for each document of the plurality of documents 510. With reference to FIG. 5, the plurality of documents 510 comprises documents 511, 512, 513, 514, 515, 516 and 517.

In order to compute a respective ranking score for each one of the plurality of documents 510, the ranking server 132 may input into the ranking MLA 162 the query-document information 502, which comprises the query 504 and the plurality of documents 510, and the set of previous user feedback data point 520 that comprises respectively associated previous user feedback data points 521, 522, 523, 524, 525, 526 and 527.

As a result, the ranking MLA 162 may compute the plurality of ranking scores 530, which comprises a respective ranking score for each of the plurality of documents 510. A given ranking score may be indicative of an estimated relevance of a respective document to the query 504.

In some embodiments, a respective ranking score may be indicative of the original rank of a respective document in the list of ranked documents 600 depicted in FIG. 6. The list of ranked documents 600 comprises all documents of the plurality of documents 510 that are ranked according to a decreasing order of the respectively associated ranking scores of the plurality of ranking scores 530.

STEP 1304: Computing a Class Association Value for Each Document of the Plurality of Documents The method 1300 then continues to step 1304 with the ranking server 132 computing a respective class association value for each document of the plurality of documents 510. With reference to FIG. 5, in order to compute a respective class association value for each one of the plurality of documents 510, the ranking server 132 may input into the prediction MLA 164 the query-document information 502 which comprises the query 504 and the plurality of documents 510.

As a result, the prediction MLA 164 may compute the plurality of class association values 540 which comprises a respective class association value for each of the plurality of documents 510.

In some embodiments, a given class association value may be a probability of a respective document to be associated with a predetermined class of documents having been determined by the operator of the ranking application 160. The operator may determine the predetermined class of documents from the plurality of human assessed classes of documents.

For example, when the plurality of human assessed classes comprises "Bad", "Fair", "Good", "Excellent" and "Perfect" classes of documents, the operator of the ranking application 160 may configure the prediction MLA 164 to output a probability of a given document to be associated with one of the "Bad", "Fair", "Good", "Excellent" and "Perfect" classes. As such, the operator may configure the prediction MLA 164 to "learn" to predict a probability with which the given document is associated with the "Good" class, for example. In another example, the operator may configure the prediction MLA 164 to "learn" to predict a probability with which the given document is associated with the "Excellent" class.

In other embodiments of the present technology, a given class association value may be instrumental in increasing a magnitude of change of the original rank of the respective document.

STEP 1306: Computing an Amended Ranking Score for Each Document of the Plurality of Documents The method 1300 continues to step 1306 with the ranking server 132 computing an amended ranking score for each document of the plurality of documents 510 based on a respective ranking score and a respective class association value.

In some embodiments of the present technology and with reference to FIG. 7, there is depicted the plurality of amended ranking score 710 which comprises a respective amended ranking score for each one of the plurality of documents 510. It can be said that, in some embodiments, a given amended ranking score may be computed as a sum of a respective ranking score and a respective class association value for each one of the plurality of documents 510.

All documents of the plurality of documents 510 may be ranked according to their respectively associated amended ranking score of the plurality of amended ranking scores 710. As a result, the ranking server 132 may generate the first amended list of ranked documents 800 as depicted in FIG. 8. A given amended ranking score being indicative of an amended relevance of a respective document to the query.

In some embodiments, the higher a given class association value is for a given document, the more likely that the magnitude of change of the original rank of the given document will be high. This means that, generally speaking, documents associated with higher class association values are more likely to have high magnitudes of change of their original ranks in comparison with documents associated with lower class association values. Put another way, it's contemplated that documents that have high probabilities of being associated with the predetermined class of documents are more likely to have high magnitudes of change of their original ranks in comparison with documents that have low probabilities of being associated with the predetermined class of documents.

It can be said that the magnitude of change of the original rank of the document 515 (i.e., in the list of ranked documents 600) was increased at least partially due to the fact that the class association value 545 that is associated with the document 515 is high.

In other embodiments of the present technology, a given amended ranking score may be computed as a weighted sum of a respective ranking score and a respective class association value for each one of the plurality of documents 510. Indeed, a given amended ranking score for a respective document can be computed according to equation 1.

When the amended ranking scores of the plurality of amended ranking scores 1010 (see FIG. 10) are computed as weighted sums of the respective ranking scores and the respective class association values, the respective weighting parameters may "normalize" the ranges of the ranking scores and of the class association values if the operator of the ranking application 160 considers them as being "ill-matched". This normalisation effect can be attributed to the normalisation constant k based on which a respective weighting parameter is computed. Additionally, the respective weighting parameters may control magnitudes of change of the original ranks of the respective documents. Indeed, this controlling effect may allow increasing the respective amended ranking score with comparison to the respective ranking score as well as decreasing it. This controlling effect may also reduce the influence of a respective class association value on the respective magnitude of change of the original rank of the respective document.

With reference to FIG. 10, there are depicted the amended ranking scores of the plurality of amended ranking scores 1010 being computed as the weighted sums of the respective ranking scores and the respective class association values. With reference to FIG. 11, there is depicted the second amended list of ranked documents 1100 being ranked based on the amended ranking scores of FIG. 10.

STEP 1308: Triggering the Display of the SERP with Documents Ranked Based on Amended Ranking Scores The method 1300 ends at step 1308 with the ranking server 132 triggering the display of the SERP with the documents of the plurality of documents 510 that are ranked based on the respective amended ranking scores.

In some embodiments of the present technology, the ranking server 132 may provide the user device 104 with the first amended list of ranked documents 800. To that end, the ranking server 132 may be configured to generate the SERP data packet 195, as depicted in FIG. 1, which comprises information related to the first amended list of ranked documents 800 and all information necessary to trigger the display of the SERP with the plurality of documents 510 being ranked according to the first amended list of ranked documents 800.

In other embodiments of the present technology, the ranking server 132 may provide the user device 104 with the second amended list of ranked documents 1100. To that end, the ranking server 132 may be configured to generate the SERP data packet 195, as depicted in FIG. 1, which comprises information related to the second amended list of ranked documents 1100 and all information necessary to trigger the display of the SERP with the plurality of documents 510 being ranked according to the second amended list of ranked documents 1100.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

Embodiments of the present technology can be summarized as follows, expressed in numbered clauses.

CLAUSE 1. A method (1300) of ranking a plurality of documents (510) on a search engine results page (SERP) in response to a query (504) associated with a user of a search engine, the method (1300) being executed on a server (132) implementing the search engine, the method (1300) comprising:

computing (1302), by a ranking machine learning algorithm (MLA) (162) implemented by the server (132), a ranking score for each document of the plurality of documents (510), a given ranking score being indicative of an estimated relevance of a respective document to the query (504) and of an original rank of a respective document on the SERP;

computing (1304), by the server (132), a class association value for each document of the plurality of documents (510), a given class association value being a probability of a respective document to be associated with a predetermined class of documents having been determined by an operator, a given class association value being instrumental in increasing a magnitude of change of the original rank of the respective document;

computing (1306), by the server (132), an amended ranking score for each document of the plurality of documents (510) based on a respective ranking score and a respective class association value, a given amended ranking score being indicative of an amended relevance of a respective document to the query (504); and triggering (1308), by the server (132), a display of the SERP with the documents of the plurality of documents (510) being ranked based on the respective amended ranking score.

CLAUSE 2. The method (1300) of clause 1, wherein the plurality of documents (510) comprises at least one document (515) associated with limited previous user feedback (525), and wherein the amended ranking score (715, 1015) of the at least one document (515) is one of superior and inferior to the respective ranking score (535).

CLAUSE 3. The method (1300) of clause 2, wherein the method (1300) further comprises gathering, by the server (132), user feedback associated with the at least one document (515) upon the user interacting with the at least one document (515) ranked based on the respective amended ranking score (715, 1015) on the SERP.

CLAUSE 4. The method (1300) of clause 3, wherein the method (1300) further comprises storing, by the server (132), the user feedback associated with the at least one document (515) in a storage (134).

CLAUSE 5. The method (1300) of clause 4, wherein the ranking MLA (162) has been trained based on, at least, a set of training documents, respectively associated previous user feedback for each training document of the set of training documents and a respectively associated human assessor score for each training document of the set of training documents, the method (1300) further comprises:
retraining, by the server (132), the ranking MLA (162) based on an enhanced set of training documents and a respectively associated previous user feedback for each training document of the enhanced set of training documents, the enhanced set of training documents comprising the training documents of the set of training documents and the at least one document (515).

CLAUSE 6. The method (1300) of clause 4, wherein the amended ranking score (715, 1015) is instrumental in causing a change of the original rank of the at least one document (515).

CLAUSE 7. The method (1300) of clause 6, wherein the change of the original rank of the at least one document (515) is instrumental in increasing a likelihood of user interaction with the at least one document (515) in comparison with the original rank.

CLAUSE 8. The method (1300) of clause 1, wherein the computing (1304) the class association value for each document is executed by a prediction MLA (164) implemented by the server (132), the prediction MLA (164) being distinct from the ranking MLA (162), the prediction MLA (164) having been trained based on a second set of training documents and a respectively associated human assessed class of each training document of the second set of training documents, each respective associated human assessed class being one of a plurality of human assessed classes.

CLAUSE 9. The method (1300) of clause 8, wherein for a given document of the plurality of documents (510) the prediction MLA (164) outputs the probability of the given document to be associated with the predetermined class of documents, the predetermined class being one of the plurality of human assessed classes.

CLAUSE 10. The method (1300) of clause 9, wherein the set of training documents and the second set of training documents comprise at least one identical training document.

CLAUSE 11. The method (1300) of clause 1, wherein a given document having a high probability of being associated with the predetermined class is more likely to be associated with a high magnitude of change of the original rank of the given document than another document having a low probability of being associated with the predetermined class.

CLAUSE 12. The method (1300) of clause 1, wherein the method (1300) further comprises:
computing, by the server (132), a modulating parameter for each document of the plurality of documents (510), a given modulating parameter being instrumental in controlling the magnitude of change of the original rank of the respective document;
and wherein the computing (1306), by the server (132), the amended ranking score for each document of the plurality of documents (510) is based on the respective ranking score, the respective class association value and the respective modulating parameter.

CLAUSE 13. The method (1300) of clause 12, wherein the computing (1306), by the server (132), the amended ranking score for each document of the plurality of documents (510) comprises application of a formula:

$$ARS_d = RS_d + W_d * CAV_d$$

CLAUSE 14. A server (132) for ranking a plurality of documents (510) on a search engine results page (SERP) in response to a query (504) associated with a user of a search engine, the server (132) implementing the search engine, the server (132) being configured to execute a method (1300) of any one of clauses 1 to 13.

What is claimed is:
1. A method of ranking a plurality of documents on a search engine results page (SERP) in response to a query associated with a user of a search engine, the method being executed on a hardware server implementing the search engine, the method comprising:
computing, by a ranking machine learning algorithm (MLA) implemented by the server, a ranking score for each document of the plurality of documents, a given ranking score being indicative of an estimated relevance of a respective document to the query and of an original rank of a respective document on the SERP;
computing, by the server, a class association value for each document of the plurality of documents, a given class association value being a probability of a respective document to be associated with a predetermined class of documents having been determined by an operator, a given class association value being instrumental in increasing a magnitude of change of the original rank of the respective document;
computing, by the server, an amended ranking score for each document of the plurality of documents based on a respective ranking score and a respective class association value, a given amended ranking score being indicative of an amended relevance of a respective document to the query; and
triggering, by the server, a display of the SERP with the documents of the plurality of documents being ranked based on the respective amended ranking score;
gathering, by the server, user feedback associated with at least one document upon the user interacting with the at least one document ranked based on the respective amended ranking score on the SERP;
using the user feedback associated with the at least one document to train the ranking machine learning algorithm (MLA).

2. The method of claim 1, wherein the plurality of documents comprises at least one document associated with limited previous user feedback, and wherein the amended ranking score of the at least one document is one of superior and inferior to the respective ranking score.

3. The method of claim 2, wherein the method further comprises storing, by the server, the user feedback associated with the at least one document in a storage.

4. The method of claim 3, wherein the ranking MLA has been trained based on, at least, a set of training documents, respectively associated previous user feedback for each training document of the set of training documents and a respectively associated human assessor score for each training document of the set of training documents, the method further comprises:
retraining, by the server, the ranking MLA based on an enhanced set of training documents and a respectively associated previous user feedback for each training document of the enhanced set of training documents, the enhanced set of training documents comprising the training documents of the set of training documents and the at least one document.

5. The method of claim 3, wherein the amended ranking score is instrumental in causing a change of the original rank of the at least one document.

6. The method of claim 5, wherein the change of the original rank of the at least one document is instrumental in increasing a likelihood of user interaction with the at least one document in comparison with the original rank.

7. The method of claim 1, wherein the computing the class association value for each document is executed by a prediction MLA implemented by the server, the prediction MLA being distinct from the ranking MLA, the prediction MLA having been trained based on a second set of training documents and a respectively associated human assessed class of each training document of the second set of training documents, each respective associated human assessed class being one of a plurality of human assessed classes.

8. The method of claim 7, wherein for a given document of the plurality of documents the prediction MLA outputs the probability of the given document to be associated with the predetermined class of documents, the predetermined class being one of the plurality of human assessed classes.

9. The method of claim 8, wherein the set of training documents and the second set of training documents comprise at least one identical training document.

10. The method of claim 1, wherein a given document having a high probability of being associated with the predetermined class is more likely to be associated with a high magnitude of change of the original rank of the given document than another document having a low probability of being associated with the predetermined class.

11. The method of claim 1, wherein the method further comprises:
computing, by the server, a modulating parameter for each document of the plurality of documents, a given modulating parameter being instrumental in controlling the magnitude of change of the original rank of the respective document;
and wherein the computing, by the server, the amended ranking score for each document of the plurality of documents is based on the respective ranking score, the respective class association value and the respective modulating parameter.

12. The method of claim 11, wherein the computing, by the server, the amended ranking score for each document of the plurality of documents comprises application of a formula:

$$ARS_d = RS_d + W_d * CAV_d.$$

13. A hardware server for ranking a plurality of documents on a search engine results page (SERP) in response to a query associated with a user of a search engine, the server implementing the search engine, the server being configured to:
compute, by a ranking machine learning algorithm (MLA) implemented by the server, a ranking score for each document of the plurality of documents, a given ranking score being indicative of an estimated relevance of a respective document to the query and of an original rank of a respective document on the SERP;
compute a class association value for each document of the plurality of documents, a given class association value being a probability of a respective document to be associated with a predetermined class of documents having been determined by an operator, a given class association value being instrumental in increasing a magnitude of change of the original rank of the respective document;
compute an amended ranking score for each document of the plurality of documents based on a respective ranking score and a respective class association value, a given amended ranking score being indicative of an amended relevance of a respective document to the query; and
trigger a display of the SERP with the documents of the plurality of documents being ranked based on the respective amended ranking score;
gather, by the server, user feedback associated with at least one document upon the user interacting with the at least one document ranked based on the respective amended ranking score on the SERP;
use the user feedback associated with the at least one document to train the ranking machine learning algorithm (MLA).

14. The server of claim 13, wherein the plurality of documents comprises at least one document associated with limited previous user feedback, and wherein the amended ranking score of the at least one document is one of superior and inferior to the respective ranking score.

15. The server of claim 14, wherein the server is further configured to store the user feedback associated with the at least one document in a storage.

16. The server of claim 15, wherein the ranking MLA has been trained based on, at least, a set of training documents, respectively associated previous user feedback for each training document of the set of training documents and a respectively associated human assessor score for each training document of the set of training documents, the server being further configured to:
retrain the ranking MLA based on an enhanced set of training documents and a respectively associated previous user feedback for each training document of the enhanced set of training documents, the enhanced set of training documents comprising the training documents of the set of training documents and the at least one document.

17. The server of claim 15, wherein the amended ranking score is instrumental in causing a change of the original rank of the at least one document.

18. The server of claim 17, wherein the change of the original rank of the at least one document is instrumental in increasing a likelihood of user interaction with the at least one document in comparison with the original rank.

* * * * *